(12) United States Patent
Nie et al.

(10) Patent No.: US 11,900,155 B2
(45) Date of Patent: Feb. 13, 2024

(54) METHOD, DEVICE, AND COMPUTER PROGRAM PRODUCT FOR JOB PROCESSING

(71) Applicant: EMC IP Holding Company LLC, Hopkinton, MA (US)

(72) Inventors: YuHong Nie, Shanghai (CN); Pengfei Wu, Shanghai (CN); Jinpeng Liu, Shanghai (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 252 days.

(21) Appl. No.: 16/801,473

(22) Filed: Feb. 26, 2020

(65) Prior Publication Data
US 2021/0165685 A1 Jun. 3, 2021

(30) Foreign Application Priority Data
Nov. 28, 2019 (CN) .......................... 201911187922.7

(51) Int. Cl.
*G06F 9/48* (2006.01)
*G06F 9/50* (2006.01)
*G06Q 10/0631* (2023.01)

(52) U.S. Cl.
CPC .......... *G06F 9/4881* (2013.01); *G06F 9/5083* (2013.01); *G06F 2209/486* (2013.01); *G06Q 10/06315* (2013.01)

(58) Field of Classification Search
CPC ............... G06F 9/4843–5083; G06F 2209/486
See application file for complete search history.

(56) References Cited

U.S. PATENT DOCUMENTS 9,794,136 B1 * 10/2017 Fakhouri ............. H04L 41/5054
10,360,606 B2 * 7/2019 Nedeltchev ............. H04L 67/51
(Continued)

FOREIGN PATENT DOCUMENTS

| CN | 102567086 A | 7/2012 |
| CN | 103164189 A | 6/2013 |

(Continued)

OTHER PUBLICATIONS

Smart Task Distributor for MapReduce on Cloud Computing Tzu-Chi Huang, Kuo-Chih Chu, Jun-Ming Liang (Year: 2014).*
(Continued)

*Primary Examiner* — Emerson C Puente
*Assistant Examiner* — Paul V Mills
(74) *Attorney, Agent, or Firm* — Ryan, Mason & Lewis, LLP

(57) ABSTRACT

The present disclosure relates to a method, device and computer program product for processing a job. In a method, a first group of tasks in a first portion of the job are obtained, the first group of tasks being executable in parallel by a first group of processing devices. A plurality of priorities are set to a plurality of processing devices, respectively, based on a state of a processing resource of a processing device among the plurality of processing devices in a distributed processing system, the processing resource comprising at least one of a computing resource and a storage resource. The first group of processing devices are selected from the plurality of processing devices based on the plurality of priorities. The first group of tasks are allocated to the first group of processing devices, respectively, which process the first group of tasks for generating a first group of task results.

20 Claims, 14 Drawing Sheets

(56) References Cited

U.S. PATENT DOCUMENTS

| | | | | |
|---|---|---|---|---|
| 10,873,540 | B2* | 12/2020 | Nedeltchev | G06F 9/5072 |
| 11,249,811 | B2 | 2/2022 | Zhao et al. | |
| 2007/0143762 | A1* | 6/2007 | Arnold | G06F 9/505 |
| | | | | 718/103 |
| 2013/0290972 | A1* | 10/2013 | Cherkasova | G06F 9/5083 |
| | | | | 718/103 |
| 2014/0006534 | A1* | 1/2014 | Jain | G06F 9/5027 |
| | | | | 709/208 |
| 2014/0245298 | A1* | 8/2014 | Zhou | G06F 9/455 |
| | | | | 718/1 |
| 2015/0006735 | A1 | 1/2015 | Chai et al. | |
| 2015/0007185 | A1* | 1/2015 | Dey | G06F 9/52 |
| | | | | 718/102 |
| 2015/0067019 | A1* | 3/2015 | Balko | G06F 9/5038 |
| | | | | 709/202 |
| 2015/0215173 | A1* | 7/2015 | Dutta | H04L 41/0896 |
| | | | | 709/226 |
| 2015/0281117 | A1* | 10/2015 | Kunde | G06F 9/46 |
| | | | | 709/226 |
| 2018/0203728 | A1* | 7/2018 | Yan | G06F 11/0757 |
| 2018/0349201 | A1* | 12/2018 | Clark | H04L 9/3239 |

FOREIGN PATENT DOCUMENTS

| | | |
|---|---|---|
| CN | 104252391 A | 12/2014 |
| CN | 106326003 A | 1/2017 |
| CN | 108337109 A | 7/2018 |
| CN | 110389824 A | 10/2019 |

OTHER PUBLICATIONS

MOON: MapReduce On Opportunistic eNvironments Heshan Lin, Xiaosong Ma, Jeremy Archuleta et al. (Year: 2010).*

Distributed Scheduler of Workflows with Deadlines in a P2P Desktop Grid Javier Celaya and Unai Arronategui (Year: 2010).*

Task scheduling scheme based on resource clustering in desktop grids Joon-Min Gil, Sungsuk Kim and JongHyuk Lee (Year: 2013).*

Optimal Resource Selection by using Fuzzy Numbers Muhammad Aqeell, M.A.Ansari and Muhammad Affaan3 (Year: 2007).*

Pado: A Data Processing Engine for Harnessing Transient Resources in Datacenters Youngseok Yang, Geon-Woo Kim, Won Wook Song, Yunseong Lee, Andrew Chung, Zhengping Qian, Brian Cho, Byung-Gon Chun (Year: 2017).*

Blockchain Consensus Algorithms: A Survey Md Sadek Ferdous, Jabed Morshed Chowdhury, Mohammad A. Hoque, and Alan Colman (Year: 2020).*

From Desktop Grid to Cloud Computing Based on BonjourGrid Middleware Karim Hassan, Heithem Abbes, Mohamed Jemni (Year: 2013).*

Smart Redundancy for Distributed Computation Yuriy Brun, George Edwards, Jae young Bang, and Nenad Medvidovic (Year: 2011).*

A Hybrid Grid/Cloud Distributed Platform: A Case Study Mohamed Ben Belgacem Haithem Hafsi, and Nabil Abdennadher (Year: 2013).*

Cost-Benefit Analysis of Cloud Computing versus Desktop Grids Derrick Kondo Bahman Javadi Paul Malecot Franck Cappello David P. Anderson (Year: 2009).*

Optimized Replication Management with Reputation for Detecting Collusion in Large Scale Cloud Systems Hanane Bennasar, Mohammad Essaaidi, Ahmed Bendahmane, and Jalel Ben-othman (Year: 2019).*

Sabotage-tolerance mechanisms for volunteer computing systems Luis Sarmenta (Year: 2002).*

Probabilistic Byzantine Tolerance for Cloud Computing Luciana Arantes, Roy Friedman, Olivier Marin, and Pierre Sens (Year: 2015).*

Group-based adaptive result certification mechanism in Desktop Grids SungJin Choi and Rajkumar Buyya (Year: 2010).*

Sabotage-tolerance mechanisms for volunteer computing systems Luis F.G. Sarmenta (Year: 2002).*

Volunteer Computing Luis F. G. Sarmenta Doctoral Thesis Massachusetts Institute of Technology Chpt. 1, 2, 6, 7 (Year: 2001).*

CloudCoaster: Transient-aware Bursty DatacenterWorkload Scheduling Samuel S. Ogden Tian Guo arxiv.org/abs/1907.02162 (Year: 2019).*

EDGeS: The Common Boundary between Service and Desktop Grids Zoltan Balaton, Zoltan Farkas, Gabor Gomb as, Peter Kacsuk, Robert Lovas, Attila Csaba Marosi (Year: 2008).*

Hawk: Hybrid Datacenter Scheduling Pamela Delgado, Florin Dinu, Anne-Marie Kermarrec, Willy Zwaenepoel (Year: 2015).*

Result Verification and Trust-based Scheduling in Peer-to-Peer Grids Shanyu Zhao, Virginia Lo and Chris GauthierDickey (Year: 2005).* spark.apache.org, "Apache Spark—Unified Analytics Engine for Big Data," https://spark.apache.org/, 2018, 4 pages.

blockchain.com, "The Most Trusted Crypto Company," https://www.blockchain.com/, 2019, 10 pages.

Wikipedia, "Verifiable Computing," https://en.wikipedia.org/wiki/Verifiable_computing, Dec. 4, 2019, 4 pages.

B. Parno et al., "Pinocchio: Nearly Practical Verifiable Computation," IEEE Symposium on Security and Privacy, May 19-22, 2013, pp. 238-252.

Filecoin, "A Robust Foundation for Humanity's Information," https://filecoin.io, Jan. 3, 2020, 11 pages.

Wikipedia, "Smart Contract," https://en.wikipedia.org/wiki/Smart_contract, Dec. 8, 2019, 5 pages.

U.S. Appl. No. 16/797,794 filed in the name of Pengfei Wu et al. on Feb. 21, 2020, and entitled "Method, Device, and Computer Program Product for Job Processing.".

* cited by examiner

METHOD, DEVICE, AND COMPUTER PROGRAM PRODUCT FOR JOB PROCESSING

RELATED APPLICATION(S)

The present application claims priority to Chinese Patent Application No. 201911187922.7, filed Nov. 28, 2019, and entitled "Method, Device, and Computer Program Product for Job Processing," which is incorporated by reference herein in its entirety.

FIELD

Various implementations of the present disclosure relate to job processing, and more specifically, to a method, device and computer program product for processing a job in a distributed way.

BACKGROUND

With the development of distributed processing technology, a cloud service architecture with distributed processing capabilities has emerged. The cloud service architecture may be provided by a cloud service vendor to process jobs from clients. According to the description of a job, the job may be divided into one or more portions, and each portion may be divided into a plurality of tasks. Here, the plurality of tasks may run on a plurality of processing devices in the cloud architecture in parallel. The plurality of processing devices may return their respective processing results to generate a final job result for the job.

Generally, the cloud service vendor has a large number of processing devices with powerful processing capabilities and may provide reliable services in terms of security and processing speed. In a network environment, there currently exist many persons and/or small organizations having idle processing devices. These idle processing devices may be connected to the network environment to provide users with processing services. However, since persons and/or small organizations do not have the capability to build a cloud service architecture, and mass users do not trust processing devices provided by them, the idle processing capabilities in the network environment cannot be utilized effectively.

The processing devices of persons and/or small organizations have been proposed to be connected based on blockchain technology, so as to provide a blockchain-based processing system. The blockchain-based processing system may process jobs of users together with a cloud-based processing system. However, a lot of communication occurs between the two processing systems, and as a result, the performance of job processing is rather unsatisfactory. Therefore, it has become a focus of research for managing processing devices in a more effective way so as to provide a higher capability of job processing.

SUMMARY

Therefore, it is desirable to develop and implement a technical solution for processing a job more effectively. It is desired that the technical solution be compatible with existing technical solutions for distributed processing and job processing will be handled more effectively by reconstructing configurations of existing distributed processing systems.

According to a first aspect of the present disclosure, a method is provided for processing a job. In the method, a first group of tasks in a first portion of the job are obtained, the first group of tasks being executable in parallel by a first group of processing devices. A plurality of priorities are set to a plurality of processing devices, respectively, based on a state of a processing resource of a processing device among the plurality of processing devices in a distributed processing system, the processing resource comprising at least one of a computing resource and a storage resource. The first group of processing devices are selected from the plurality of processing devices based on the plurality of priorities. The first group of tasks are allocated to the first group of processing devices, respectively, so that the first group of processing devices utilize their respective processing resources to process the first group of tasks for generating a first group of task results.

According to a second aspect of the present disclosure, an electronic device is provided, the electronic device comprising: at least one processor; and a memory coupled to the at least one processor, the memory having instructions stored thereon, the instructions, when executed by the at least one processor, causing the device to perform acts. The acts include: obtaining a first group of tasks in a first portion of the job, the first group of tasks being executable in parallel by a first group of processing devices; setting a plurality of priorities to a plurality of processing devices based on a state of a processing resource of a processing device among the plurality of processing devices in a distributed processing system, respectively, the processing resource comprising at least one of a computing resource and a storage resource; selecting the first group of processing devices from the plurality of processing devices based on the plurality of priorities; and allocating the first group of tasks to the first group of processing devices, respectively, so that the first group of processing devices utilize their respective processing resources to process the first group of tasks for generating a first group of task results.

According to a third aspect of the present disclosure, provided is a computer program product. The computer program product is tangibly stored on a non-transitory computer-readable medium and comprises machine-executable instructions which are used to implement a method according to the first aspect of the present disclosure.

BRIEF DESCRIPTION OF THE DRAWINGS

Through a more detailed description in the accompanying drawings, features, advantages and other aspects of the implementations, the present disclosure will become more apparent. Several implementations of the present disclosure are illustrated schematically and are not intended to limit the present invention. In the drawings.

DETAILED DESCRIPTION

The preferred implementations of the present disclosure will be described in more detail with reference to the drawings. Although the drawings illustrate the preferred implementations of the present disclosure, it should be appreciated that the present disclosure can be implemented in various ways and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first," "second" and so on can refer to same or different objects. The following text can also comprise other explicit and implicit definitions.

Figure 1:
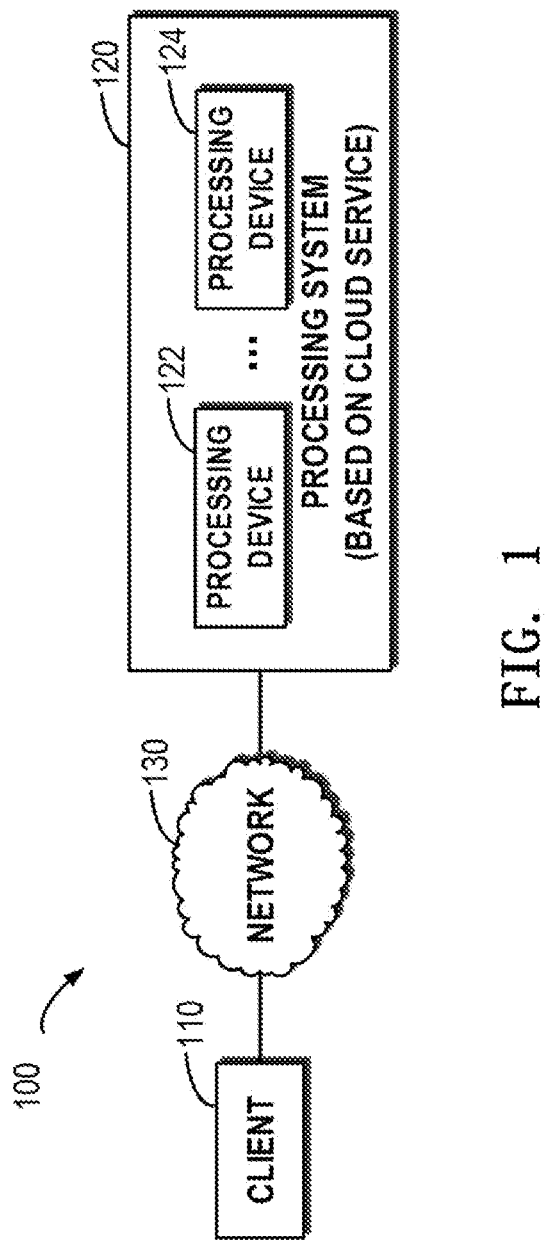
FIG. 1 schematically shows a block diagram of an application environment for processing a job according to one technical solution.

A processing system based on cloud services has emerged. With reference to FIG. 1, a brief description is presented below of a processing system based on cloud services. FIG. 1 schematically shows a block diagram of an application environment 100 for processing jobs according to one technical solution. A client 110 may process tasks by means of computing capabilities in a processing system 120 based on cloud services. In general, a cloud service vendor may provide the processing system 120 based on cloud services. The processing system 120 may comprise a plurality of processing devices 122, . . . , and 124. The cloud service vendor has powerful technical and economic strength and thus can build a separate processing system by itself.

The client 110 may use processing capabilities of various processing devices in the processing system 120 via a network 130. For example, the client 110 may send a job description of a to-be-processed job to the processing system 120 so as to invoke processing capabilities of the plurality of processing devices 122, . . . , and 124 to execute the job. A variety of engines for implementing distributed processing are available. These engines may be deployed in the processing system 120 and used to divide a received job into a plurality of tasks which are to be executed in parallel or in series.

Besides the large processing system provided by the cloud service vendor, in a network environment there further exists a large number of persons and/or small organizations having idle processing devices. However, since persons and/or small organizations lack the capability to build a cloud service architecture, and mass users do not trust processing devices provided by them, idle processing capabilities in the network environment cannot be effectively utilized. It is desirable to manage various processing devices in the network environment in a more reliable and effective way so as to provide a job processing capability.

Figure 2:
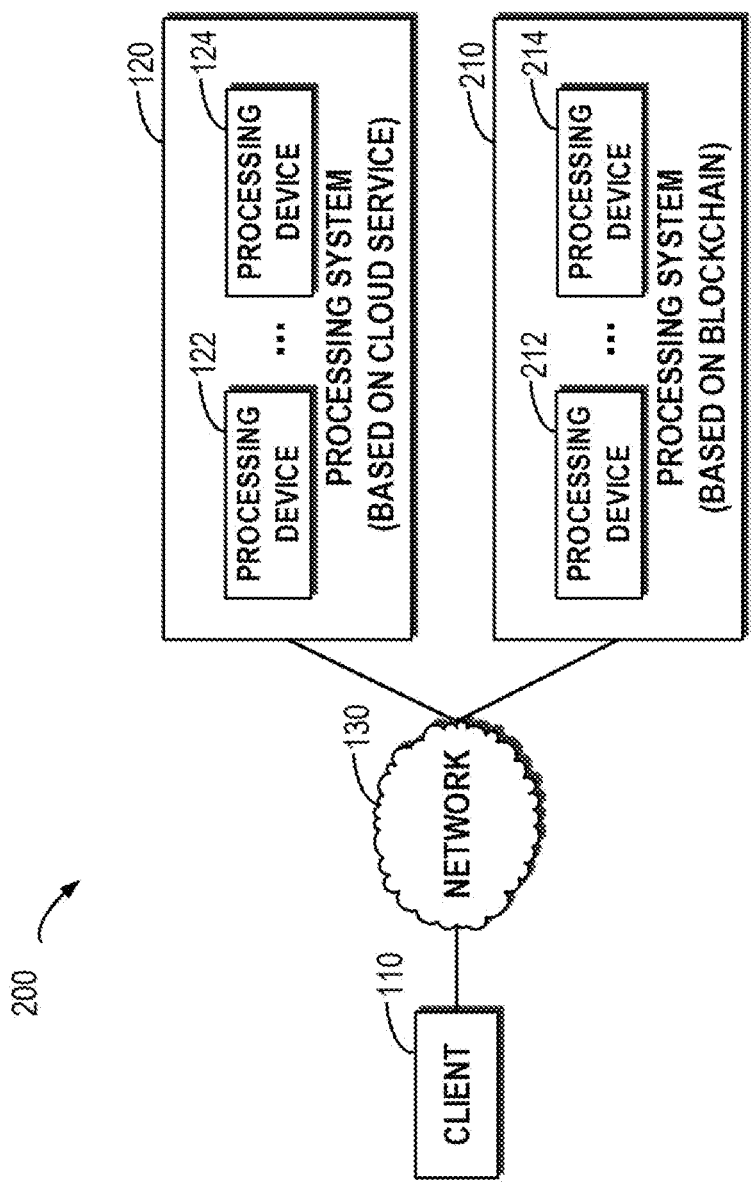
FIG. 2 schematically shows a block diagram of an application environment in which example implementations of the present disclosure may be implemented.

FIG. 2 schematically shows a block diagram of an application environment 200 in which example implementations of the present disclosure may be implemented. In the network environment 200 there may further exist processing devices 212, . . . , and 214, which may come from persons and/or small organizations. In FIG. 2, the processing devices 212, . . . , and 214 may join in a blockchain based processing system 210 to form computing nodes in the processing system 210. Since users do not trust the processing devices 212, . . . , and 214, idle processing capabilities in these processing devices cannot be utilized.

Figure 3A:
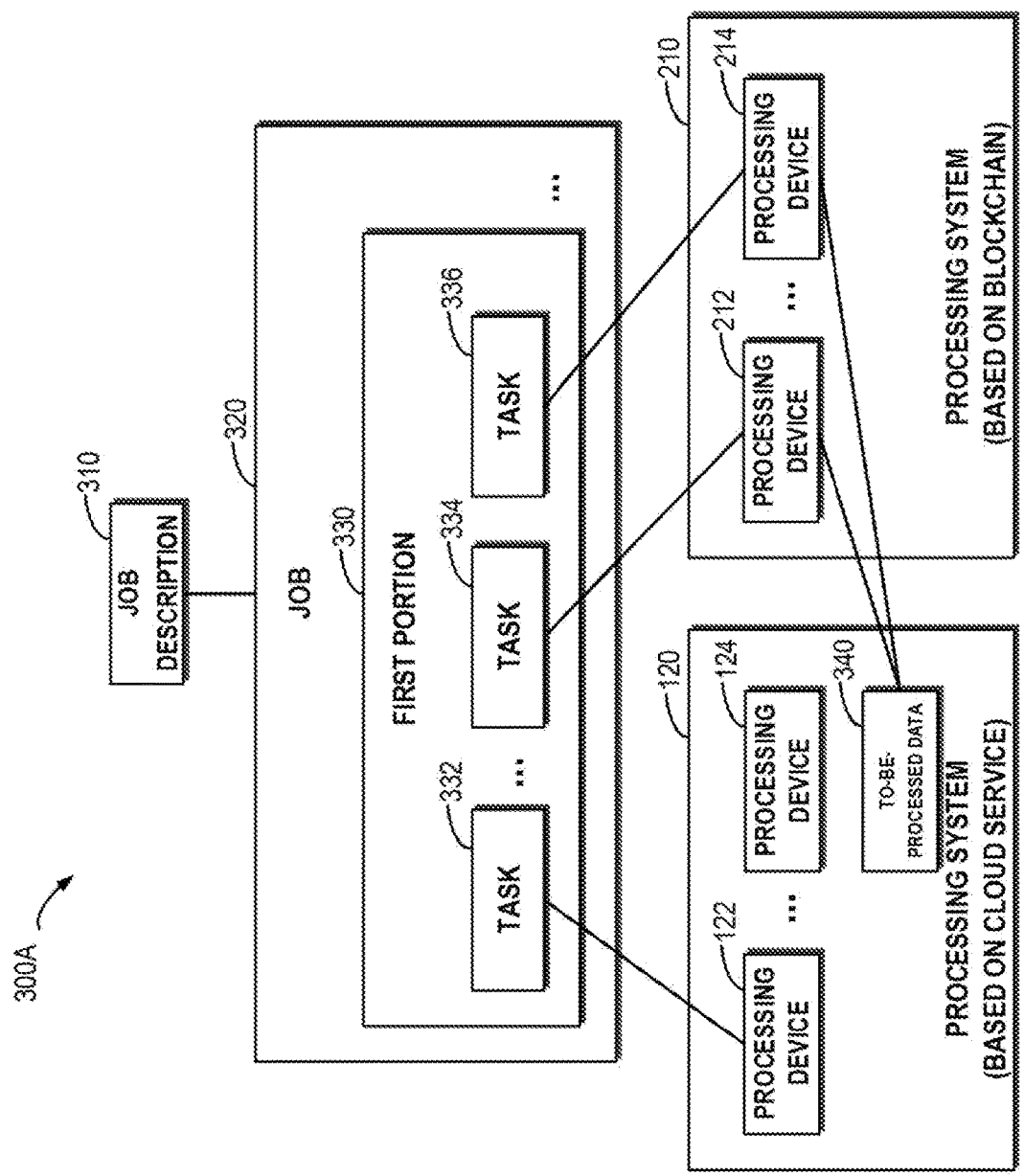
FIG. 3A schematically shows a block diagram of the procedure for processing a job according to one technical solution.

A technical solution has been proposed for job processing. The technical solution may utilize processing devices in a plurality of processing systems to process jobs, and thereby may make more use of idle processing resources from cloud service vendors and other persons and/or small organizations. FIG. 3A schematically shows a block diagram 300A of the procedure for processing a job according to one technical solution. As depicted, a job description 310 may be received from a client. Here, the job description 310 defines various information on the job, such as an operation to be performed, data to be processed, etc. Based on information defined in the job description 310, one or more portions of the job 320 may be obtained (FIG. 3A only illustrates a first portion 330, whereas a second portion and the like may further exist).

Additionally, a group of tasks 332, . . . , 334 and 336 in the first portion 330 may be obtained. It will be understood that the group of tasks 332, . . . , 334 and 336 here are a group of tasks which can be executed in parallel. Suppose the job description 310 defines that it is desirable to calculate the sales revenue of a certain product in a year, at this point 12 tasks may be obtained, and each task involves calculating the sales revenue of the product each month. It will be understood that there is no limit to the ways of obtaining the group of tasks here, but the group of tasks may be obtained by directly dividing the job based on the job description 310 or may be obtained from an existing engine.

To execute the group of tasks in parallel, the group of tasks may be allocated to a group of processing devices in a distributed processing system, respectively, so that the group of processing devices generate a group of task results for the group of tasks. Here the group of processing devices reside in a first processing system based on a cloud (e.g., the processing system 120) and a second processing system based on blockchain (e.g., the processing system 210). As shown in FIG. 3A, here the group of processing devices may comprise the processing device 122, . . . and the processing device 212, and the processing device 122 may reside in the processing system 120 while the processing device 212 may reside in the processing system 210.

It will be understood that regarding the to-be-processed data, the group of processing devices 122, . . . and 212 may process allocated tasks in parallel and return task results of the processed tasks. Subsequently, a group of task results for the group of tasks may be received from the group of processing devices, and a job result for the job may be generated at least partly based on the group of task results. With this technical solution, usable computing resources in a plurality of different processing systems may be sufficiently utilized. However, since the group of processing devices may cross different processing systems 120 and 210, the processing devices 212, . . . , and 214 in the processing system 210 have to read to-be-processed data 340 in the processing system 120, which causes a lot of communication between the two processing systems 120 and 210.

Figure 3B:
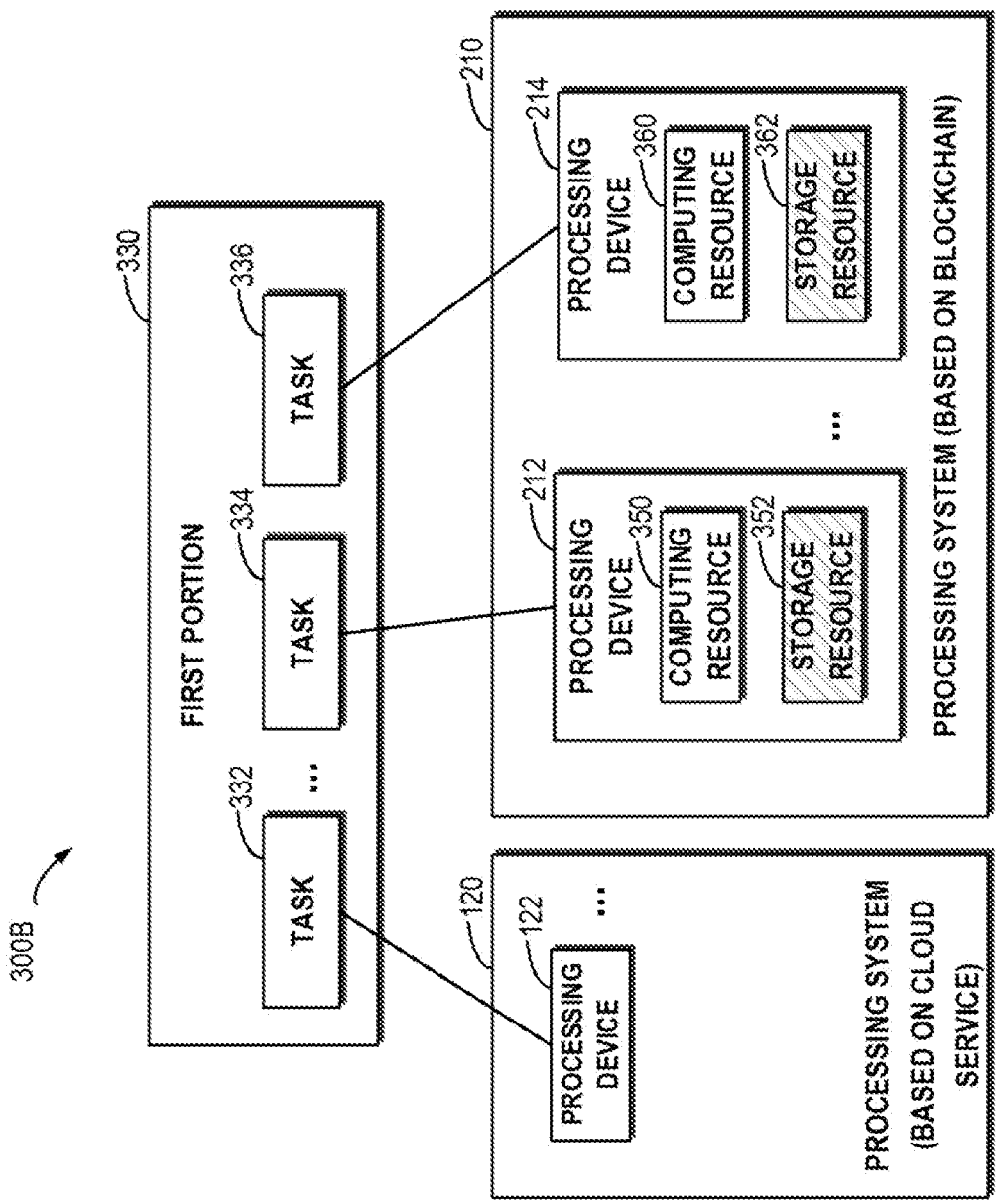
FIG. 3B schematically shows a block diagram of the procedure for processing a job according to example implementations of the present disclosure.

In view of the above drawbacks in the distributed processing system, the present disclosure proposes a method for job processing. In the method, the concept of priority of a processing device is introduced. Specifically, priorities may be set to processing devices based on states of processing resources in the processing devices, and processing devices for executing a group of tasks may be selected based on priorities of processing devices. With reference to FIG. 3B, a brief description is presented below to the method according to example implementations of the present disclosure.

FIG. 3B schematically shows a block diagram of a procedure 300B for job processing according to example implementations of the present disclosure. As depicted, the first portion 330 may comprise the group of tasks 332, . . . , 334 and 336, among which the task 332 is allocated to a processing device in the cloud service-based processing system 120, and the tasks 334 and 336 are allocated to the processing devices 212 and 214 in the blockchain-based processing system 210, respectively. It will be understood that since the cloud service-based processing system 120 already has perfect functions for allocating and processing tasks, the following description will focus on more details about operations to be performed in the blockchain-based processing system 210.

According to example implementations of the present disclosure, a processing resource of a processing device comprises at least one of a computing resource and a storage resource. The computing resource refers to computing capability, e.g., computing capability of a processor for computation in the processing device. The storage resource refers to storage space for providing data storage, e.g., a transitory memory and/or persistent memory for providing storage services. For example, the processing device 212 may comprise a computing resource 350 and a storage resource 352, and the processing device 214 may comprise a computing resource 360 and a storage resource 362.

According to example implementations of the present disclosure, a priority may be set to a processing device based on a state of a processing resource in the processing device. For example, if a processing device has abundant processing resources, then a higher priority may be set to the processing device; if a processing device has a shortage of processing resources, then a lower priority may be set to the processing device. A processing device with a higher priority may be selected to process a task in a group of tasks. With example implementations of the present disclosure, it is possible to make the best use of abundant resources (including computing and processing resources) in a processing device with a higher priority so as to improve the performance of job processing.

Figure 4:
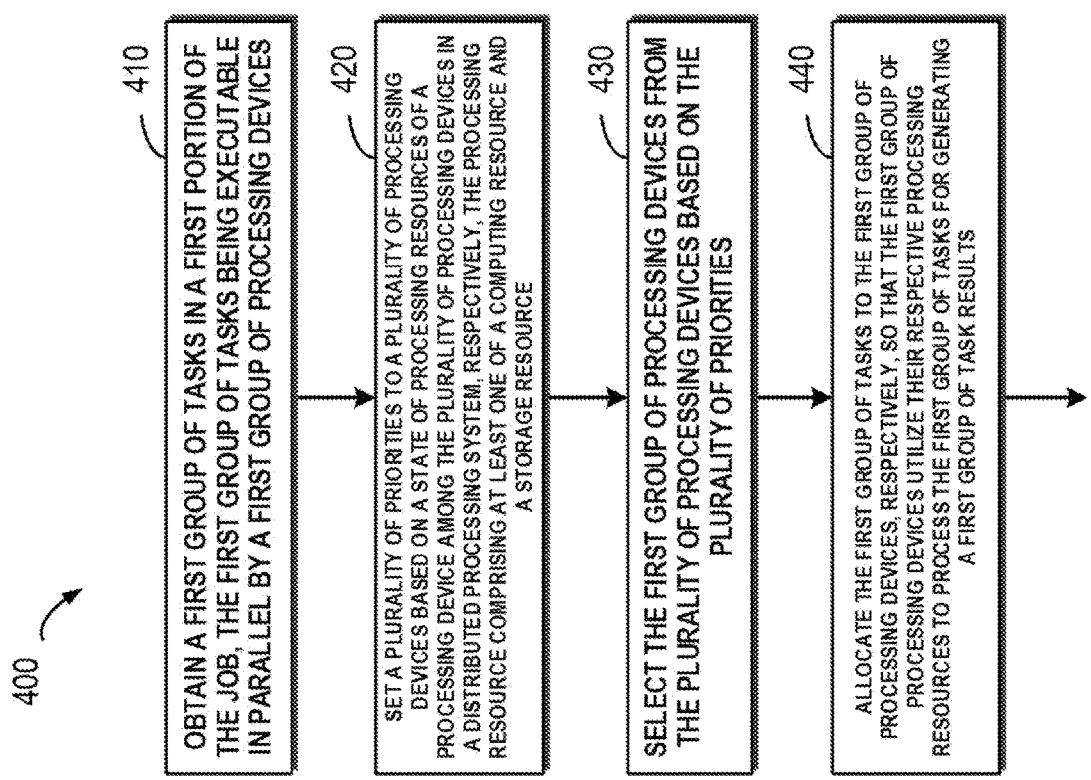
FIG. 4 schematically shows a flowchart of a method for processing a job according to example implementations of the present disclosure.

Additionally, with example implementations of the present disclosure, to-be-processed raw data and/or intermediate data associated with a job may be stored to a storage resource of a processing device in the processing system 210. In this way, the amount of data transmission between the processing systems 120 and 210 may be reduced, and further the performance of job processing may be improved. With reference to FIG. 4, a description is presented below of more details about example implementations of the present disclosure.

FIG. 4 schematically shows a flowchart of a method 400 for job processing according to example implementations of the present disclosure. A job manager may be established to perform the method 400 according to example implementations of the present disclosure. Here, the job manager may run a program so as to perform various steps of the method 400. It will be understood that the present disclosure is not intended to limit where the method 400 is performed in the distributed processing system. According to example implementations of the present disclosure, the job manager may be deployed in the cloud-based processing system 120 so as to perform various steps of the method 400. Since the processing system 120 has higher reliability and sufficient processing resources, by running the job manager in the processing system 120, it may be ensured that job processing is managed in a reliable and efficient way.

According to example implementations of the present disclosure, the job manager may be deployed in the blockchain-based processing system 210 so as to perform various steps of the method 400. By deploying the job manager in the processing system 210, it is possible to make the best use of idle resources in the processing system 210, reduce communication overheads between the job manager and various processing devices in the processing system 210 and further improve the performance of job processing.

At block 410, a first group of tasks in the first portion 330 in the job 320 may be obtained, wherein the first group of tasks may be executed in parallel by a first group of processing devices. Specifically, the first group of tasks 332, . . . , 334 and 336 in the first portion 330 in the job 320 may be obtained based on the job description 310 of the job 320 from a client. By analyzing the job description 310, the job 320 may be divided into a plurality of portions, and each portion may be divided further. Specifically, FIG. 5 schematically shows a block diagram 500 of a data structure of the job description 310 according to example implementations of the present disclosure.

Figure 5:
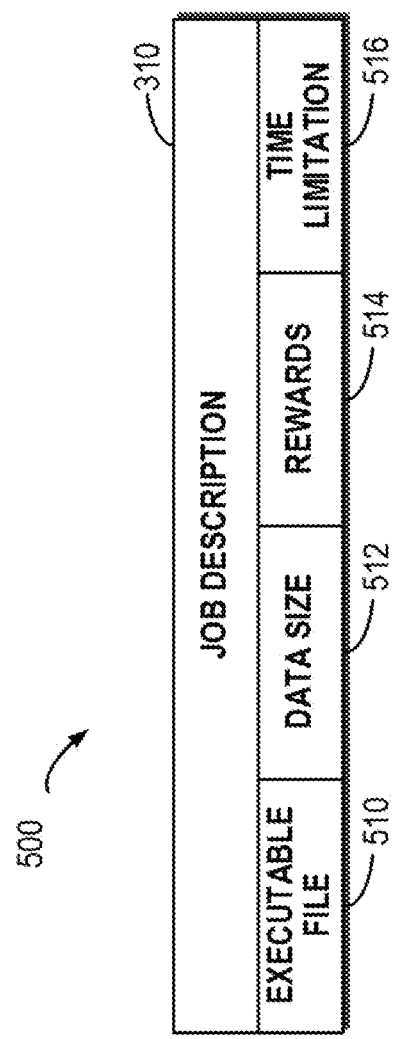
FIG. 5 schematically shows a block diagram of a data structure of a job description according to example implementations of the present disclosure.

As shown in FIG. 5, the job description 310 may comprise an executable file 510 to define a set of to-be-performed operations. By analyzing the executable file 510, contents to be performed in series may be treated as one portion. It will be understood that description is presented below by taking the first portion 330 in the job as one example, and operations on other portions may be similar. The first portion 330 may be divided so as to obtain a first group of tasks which may be executed in parallel. According to example implementations of the present disclosure, operations to be performed may be described in the form of a directed acyclic graph, and the first group of tasks may be determined based on a temporal relationship described in the graph.

As shown in FIG. 5, the job description 310 may further comprise: data size 512 for indicating the amount of to-be-processed data; a reward 514 for indicating a reward which will be given to a processing device for executing a task associated with the job; and a time limitation 516 for indicating the time when a job result is desired to be obtained.

According to example implementations of the present disclosure, the client 110 may make a request for processing a job by issuing a new topic. A list of processing devices may be set, various processing devices in the list may subscribe to topics related to job processing, and a processing device of interest may participate in processing a task in the first group of tasks. Here the first group of tasks may be allocated to a group of processing devices in the processing systems 120 and 210.

At block 420, a plurality of priorities may be respectively set to a plurality of processing devices based on states of processing resources in the plurality of processing devices in a distributed processing system. Here, the processing resources comprise at least one of a computing resource and a storage resource. According to example implementations of the present disclosure, the priority may be set based on a time duration for which the processing device promises to serve the job. In other words, the priority may be set based on a service period of processing resources. For example, an invitation may be sent to a plurality of processing devices of interest, and states of processing resources provided by the processing devices may be received from the plurality of processing devices, respectively.

For example, some processing devices may serve the job for long, i.e., may provide processing resources for a long time to process a plurality of tasks associated with the job. At this point, a long-term priority may be set to such processing devices. In another example, some processing devices cannot serve the job for long but may process only one task associated with the job, so a one-time priority may be set to such processing devices.

According to example implementations of the present disclosure, since processing resources may comprise at least one of a computing resource and a storage resource, the type of resource may further be considered when setting a priority. For example, some processing devices may comprise both computing and storage resources, some may only comprise a computing resource, while others may only comprise a storage resource. It will be understood since the computing resource is necessary in order to process a task, it may be considered in the context of the present disclosure that the computing resource is an essential condition for selecting a processing device, and the following description does not involve selecting a processing device that only comprises the storage resource. A processing device comprising both computing and storage resources may be selected. Alternatively and/or additionally, a processing device comprising only the computing resource may also be selected.

Figure 6:
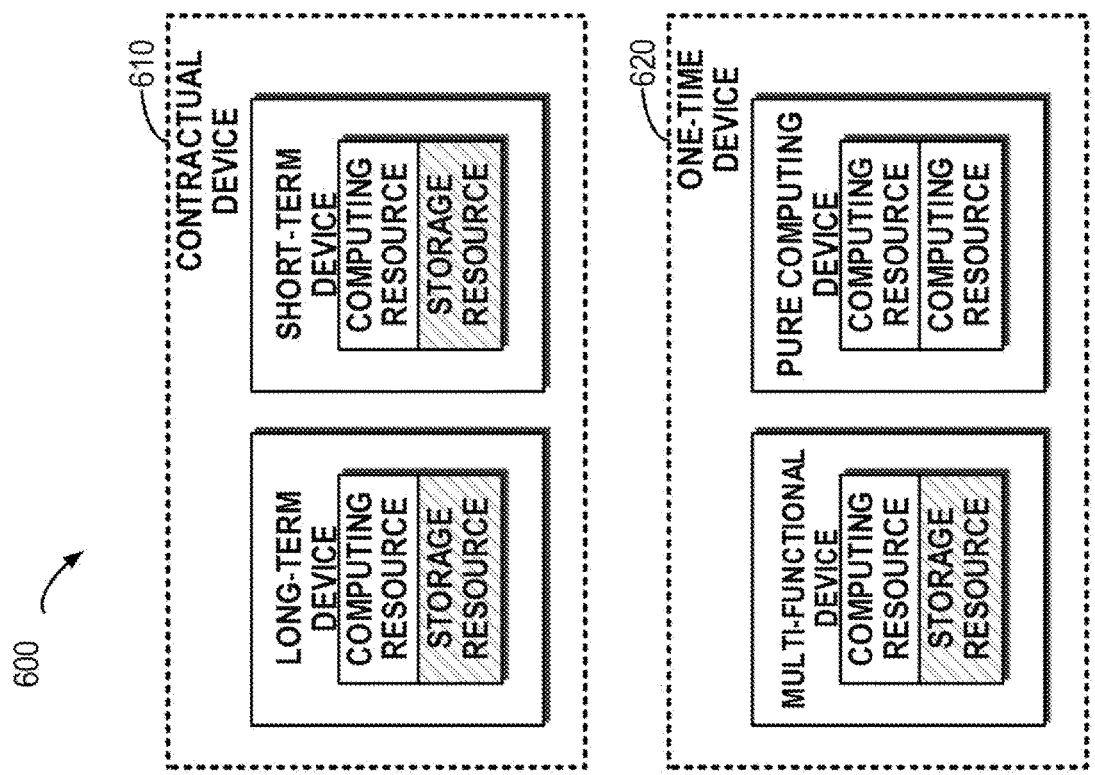
FIG. 6 schematically shows a block diagram of different types of resources divided based on service periods of resources according to example implementations of the present disclosure.

Description is presented below to more types of processing devices with reference to FIG. 6. This figure schematically shows a block diagram 600 of different types of resources divided based on service periods of resources according to example implementations of the present disclosure. As depicted, contractual devices 610 may comprise a long-term device and a short-term device, here the long-term device and the short-term device have both computing and storage resources. Specifically, different priorities may be set to the long-term device and the short-term device in the contractual devices 610. Here, the long-term device and the short-term device comprise both computing and storage resources. There may further exist one-time devices 620, which may comprise a multi-functional device (comprising both computing and storage resources) and a pure computing device (only comprising a computing resource).

According to example implementations of the present disclosure, long-term priorities may be set to processing devices. Here, long-term priorities may comprise a first priority and a second priority. If it is determined that processing resources may be used to process all allocated tasks associated with the job, then the first priority may be set to the processing device. Here, the first priority may indicate that the processing device should not refuse to execute any task associated with the job. In other words, if a processing device has the first priority, then it is required that the processing device should not stop serving the job while the job is executed (i.e., while any task in each portion of the job is executed). As long as a task is allocated to the processing device, the processing device should accept the task. At this point, the processing device with the first priority establishes a long-term service agreement with the job. According to example implementations of the present disclosure, since the processing device with the first priority always serves the job, the job manager may be deployed on the processing device with the first priority. In this way, the method 400 may run on the processing device that serves the job all the time, and thus it may be ensured that the method 400 that is responsible for processing the job will not be interrupted.

According to example implementations of the present disclosure, a second priority may be set to the processing device in accordance with determining that the processing resources may be used to process at least two allocated tasks associated with the job. At this point, the processing device with the second priority establishes a short-term service agreement with the job. After the processing device has processed two tasks, the processing device may choose to continue or exit service.

According to example implementations of the present disclosure, one-time priorities may be set to processing devices. Here, the one-time priorities may comprise a third priority and a fourth priority. In one implementation, if the processing resources comprise both computing and storage resources, and the processing resources may be used to process only one allocated task associated with the task, then the third priority may be set to the processing device. In another implementation, if the processing resources only comprise a computing resource, and the processing resources may be used to process only one allocated task associated with the job, then the fourth priority may be set to the processing device. Here, the third/fourth priority may indicate that the processing device only processes one task associated with the job. At this point, the processing device with the third/fourth priority establishes a one-time service agreement with the job. Once the processing device has processed one task, the processing device may not accept any task associated with the job.

In the initial stage after the job is started, various processing devices in the processing system 210 may be asked which type of priority to select. Suppose the processing device 212 has been idle for a long time, then the first priority may be assigned to the processing device 212; suppose the processing device 214 has a heavier workload, then the third priority may be assigned to the processing device 214; suppose a processing device has a medium workload, then the second priority may be assigned to the processing device. According to example implementations of the present disclosure, the first group of processing devices for processing the first group of tasks may be selected based on priorities of various processing devices.

At block 430, the first group of processing devices may be selected from the plurality of processing devices based on the plurality of priorities. Preferably, a processing device with a higher priority may be selected. For example, in the above described implementations about the first priority to the fourth priority, a processing device with the first priority may be selected. Since such processing devices should not reject any task associated with the job, it may be ensured that tasks will not be rejected when allocated to such processing devices. Furthermore, if there is an insufficient number of processing devices with the first priority, processing devices with the second priority may be selected. When processing devices with the first priority or the second priority are insufficient, processing devices with the third priority may be selected. Communication and negotiation with a processing device as to whether the processing device accepts a task will cause extra overheads of time and processing resources. With example implementations of the present disclosure, a task is preferably allocated to a processing device with a higher priority, which can reduce overheads related to task processing and further improve the efficiency.

It will be understood that the priority here is associated with a time period when the job is processed. Once the job has been completed, the processing device is no longer needed to execute a task associated with the job. According to example implementations of the present disclosure, if it is determined that all tasks associated with the job have been completed, processing devices with the first priority and the second priority may be notified to exit. At this point, the service period of processing devices for the job ends.

At block 440, the first group of tasks may be allocated to the first group of processing devices, respectively, so that the first group of processing devices use their respective processing resources to process the first group of tasks for generating a first group of task results. Returning to FIG. 3B, here the first group of processing devices may comprise the processing devices 122, . . . and the processing devices 212 and 214, and the processing device 122 may reside in the processing system 120, while the processing devices 212 and 214 may reside in the processing system 210.

Figure 7:
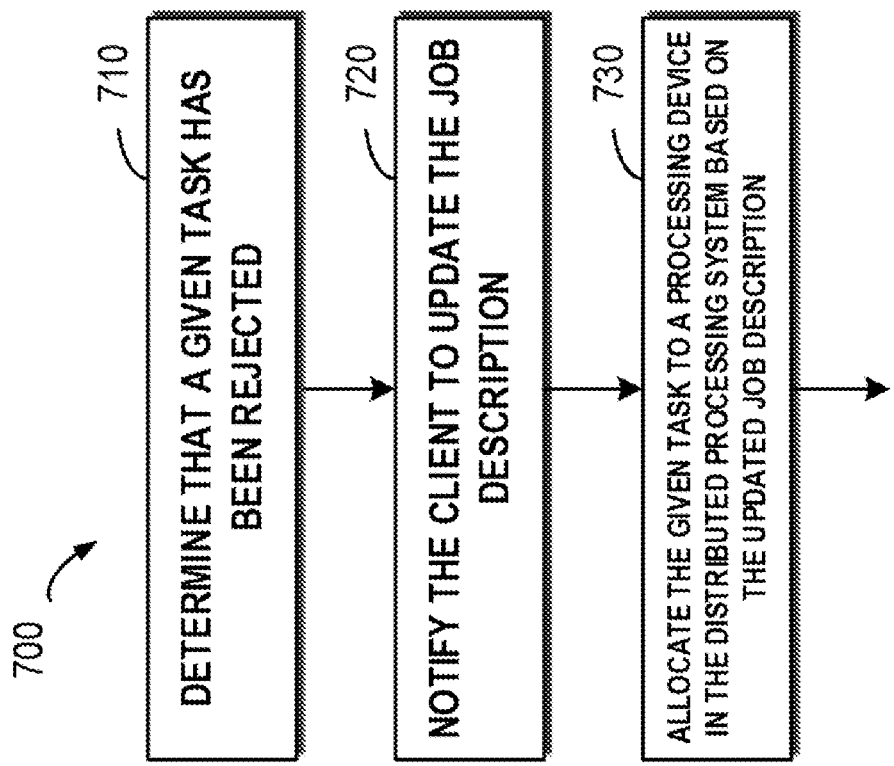
FIG. 7 schematically shows a block diagram for processing a rejected task according to example implementations of the present disclosure.

According to example implementations of the present disclosure, the first group of tasks which can be processed in parallel may be presented to various processing devices in the processing system 210. A processing device of interest may accept and execute a task. According to example implementations of the present disclosure, while allocating the first group of tasks, some tasks may be rejected, at which point rejected tasks need to be reallocated. It will be understood that various reasons may cause tasks to be rejected. For example, there may be no idle processing device within the time limitation specified by the job description 310; in another example, the owner of a processing device may not be satisfied with a reward for accomplishing a task, etc. At this point, the task rejection needs to notify the client, so that an initiator of the job may adjust relevant content in the job description 310. With reference to FIG. 7, description is presented below of more details on how to process a rejected task.

FIG. 7 schematically shows a block diagram of a method 700 for processing a rejected task according to example implementations of the present disclosure. First, it may be determined whether a task is rejected. If at block 710 it is determined that the task is rejected, then the method 700 proceeds to block 720, notifying the client 110 to update the job description 310. Here, the job description 310 may comprise an agreement with a processing device that processes a task associated with the job. For example, the agreement may comprise various contents described with reference to FIG. 5, i.e., size of to-be-processed data, a reward for the job, time limitation when the job is desired to be completed, etc. According to example implementations of the present disclosure, the agreement here may be an agreement associated with the whole job.

For example, suppose the job initiator specifies he/she wants to get a result within 1 hour, whereas currently there is no idle processing device, and thus a task is rejected. The job initiator may update contents of the job description 310, for example, may modify the time limitation from 1 hour to 2 hours. In another example, suppose the owner of a processing device believes the reward offered by the initiator is too low, then the initiator may increase the reward. Subsequently, at block 730, the rejected task may be reallocated to a processing device in the distributed processing system based on the updated job description from the client 110. Continuing the above example, since the initiator has updated the time limit and/or increased the reward, when reallocating the rejected task, if a processing device considers the updated time limitation and/or reward as acceptable, then the processing device may accept the reallocated task.

According to example implementations of the present disclosure, allocating the task to the processing device may comprise two portions: transmitting the task itself (e.g., a set of instructions) to the processing device, and notifying the processing device of where to obtain to-be-processed input data. Regarding the former, a set of instructions for executing the task may be directly transmitted to a processing device with a higher priority. Regarding the latter, an address of to-be-processed data may be transmitted to the processing device.

First, a first group of data partitions associated with the first group of tasks may be respectively generated based on raw data associated with the job 320. Here, each task corresponds to one data partition. In order to reduce data transmission between the two processing systems 120 and 210, to-be-processed data partitions may be stored to a processing system where the first group of processing devices reside. At this point, the first group of data partitions may be stored to storage resources in the first group of processing devices, and the first group of processing devices may be instructed to obtain the first group of data partitions from storage resources in the first group of processing devices.

Returning to FIG. 3B, suppose the task 334 is allocated to the processing device 212, then a data partition that is to be processed by the processing device 212 may be stored to a storage resource 352 in the processing device 212. In this way, the computing resource 350 may directly read the to-be-processed data partition from its own storage resource 352, thereby bandwidth and time overheads caused by reading a data partition from another location outside the processing device 212 may be avoided.

Figure 8:
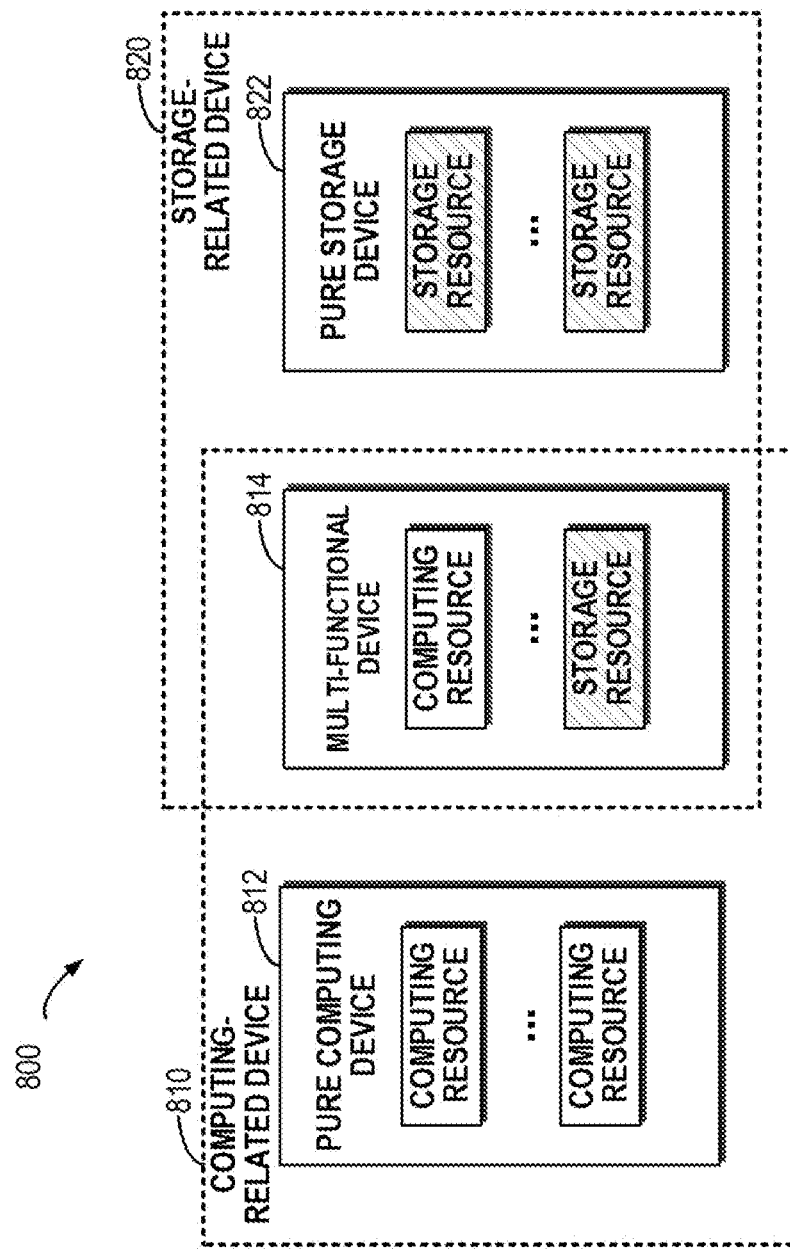
FIG. 8 schematically shows a block diagram of the classification of processing devices comprising different types of resources according to example implementations of the present disclosure.

Alternatively and/or additionally, the to-be-processed data partition may also be stored to a storage resource in another processing device in the processing system 210. For example, the data partition may be stored in the storage resource 362 of the processing device 214. Generally, if data is stored to a cloud-based processing system, then writing data to the cloud, retaining data in the cloud and reading data from the cloud will take various resources of cloud services and a fee should be paid to the vendor of cloud services. In example implementations of the present disclosure, the plurality of processing devices in the processing system 210 may be distributed at different geographical locations. Although storing and reading data partitions may cause bandwidth and time overheads, such a storage mode may provide users with multiple alternative storage modes. With reference to FIG. 8, description is presented to more details about processing devices.

FIG. 8 schematically shows a block diagram 800 of the classification of processing devices comprising different types of resources according to example implementations of the present disclosure. As depicted, there may be a plurality of types of processing devices: pure computing devices 812, which devices may only comprise computing resources; pure storage devices 822, which devices may only comprise storage resources; and multi-functional devices 814, which devices may comprise computing resources and storage resources. At this point, computing-related devices 810 may comprise pure computing devices 812 and multi-functional devices 814, and storage-related devices 820 may comprise pure storage devices 822 and multi-functional devices 814.

Figure 9:
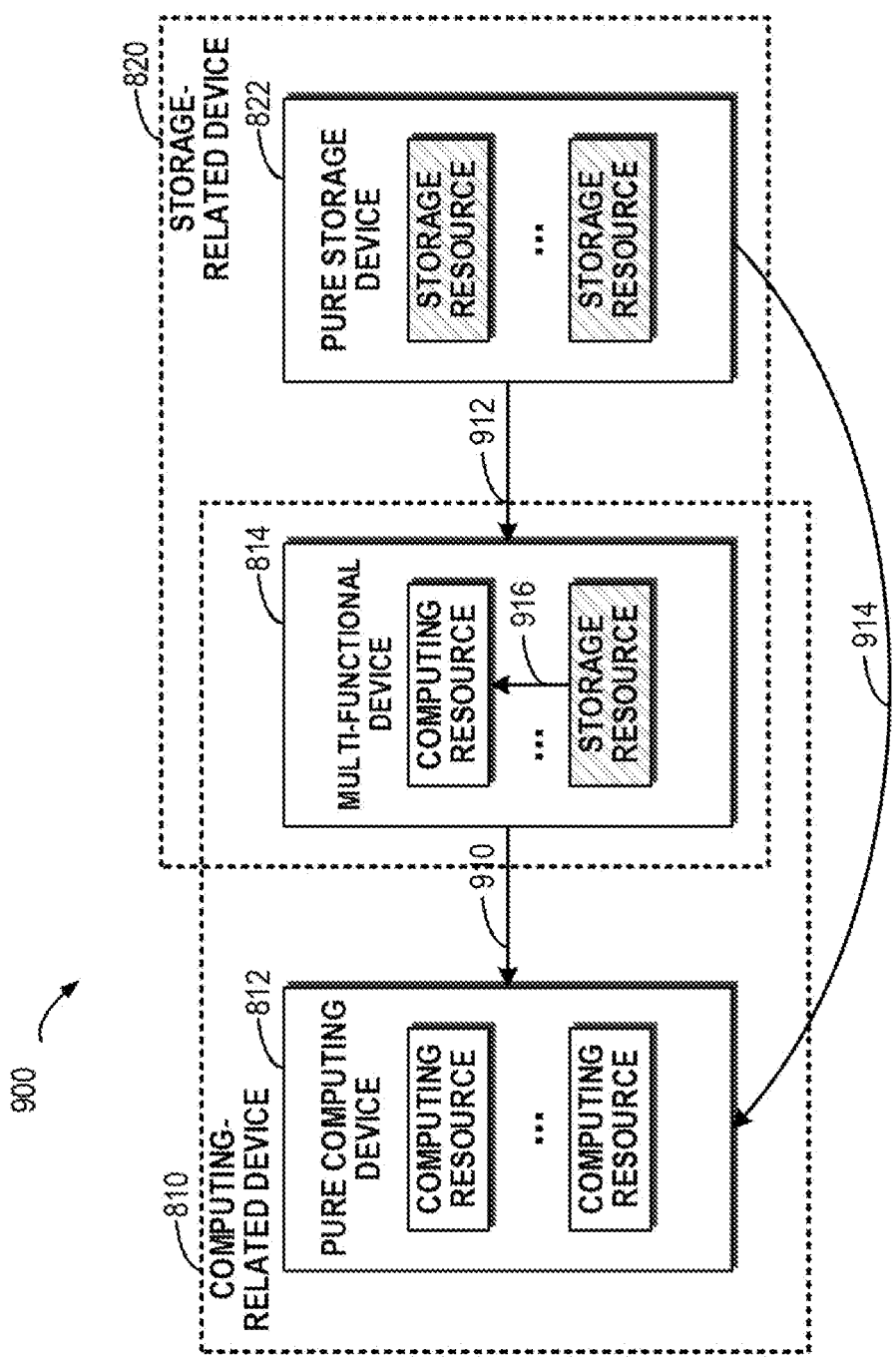
FIG. 9 schematically shows a block diagram of the procedure for reading to-be-processed data during task processing according to example implementations of the present disclosure.

According to example implementations of the present disclosure, the computing-related device 810 may read a to-be-processed data partition from a specified location in the storage-related device 820. FIG. 9 schematically shows a block diagram 900 of the procedure for reading to-be-processed data during task processing according to example implementations of the present disclosure. As depicted, arrows 910, 912, 914 and 916 schematically show transmission directions of to-be-read data partitions, respectively. The computing resource in the pure computing device 812 may read a data partition from the storage resource in the multi-functional device 814, here the procedure for reading the data partition is shown by the arrow 910. The computing resource in the pure computing device 812 may read a data partition from the storage resource in the pure storage device 822, here the procedure for reading the data partition is shown by the arrow 914. The computing resource in the multi-functional device 814 may read a data partition from the storage resource in the multi-functional device 814, here the procedure for reading the data partition is shown by the arrow 916. The computing resource in the multi-functional device 814 may read a data partition from the storage resource in the pure storage device 822, here the procedure for reading the data partition is shown by the arrow 912.

Suppose the processing device 212 in the processing system 210 has accepted a task, then the processing device 212 may perform processing based on the allocated task. It will be understood that the task is associated with specific to-be-processed data. Suppose the task is to calculate sales revenue of a product in a month, then to-be-processed raw data may be, for example, sales revenue of various shops in January, February, . . . , and December. According to example implementations of the present disclosure, a first group of data partitions associated with the first group of tasks may be generated based on raw data associated with the job. It will be understood that one data partition in the group of data partitions may correspond to one task allocated to one processing device. In other words, the processing device may execute the allocated task with respect to a data partition. Subsequently, each processing device may process sales revenue of one month.

To ensure that various processing devices may obtain their respective to-be-processed raw data, the first group of data partitions may be stored to storage resources in the processing system 210. At this point, when allocating the first group of tasks to the first group of processing devices in the distributed storage system, the first group of processing devices may be instructed to obtain the first group of data partitions from the storage space. Specifically, a processing device may be notified of an address where a data partition is stored (e.g., a path for accessing a data partition), so as to obtain the data partition.

The processing device that has accepted the task may use its own computing resource to execute a set of instructions defined by the task with respect to the data partition, so as to generate a corresponding task result. One processing device may read one data partition and generate one task result. It will be understood that since processing devices from persons and/or small organizations have lower security and are vulnerable to attack from hackers or malware, these processing devices may have lower credibility. Therefore, task results from these processing devices cannot be fully trusted, but additional verification needs to be provided for ensuring that a task result provided by a processing device really results from executing the task with respect to the data partition.

According to example implementations of the present disclosure, double verification is provided with respect to a task result from a processing device in the blockchain-based processing system 210. First, in a first-level verification process, it may be determined whether the task result is trusted or not based on a computation verification rule. If the task result passes the first-level verification, this means the task result is trusted. If the task result does not pass the first-level verification, a voting process may be started so as to vote on the task result that does not pass the primary verification. If a voting result satisfies a predetermined condition, then it may be considered that the task result is trusted, otherwise the task result may be marked as untrusted. More details about the voting operation will be described with reference to FIG. 10 below.

Figure 10:
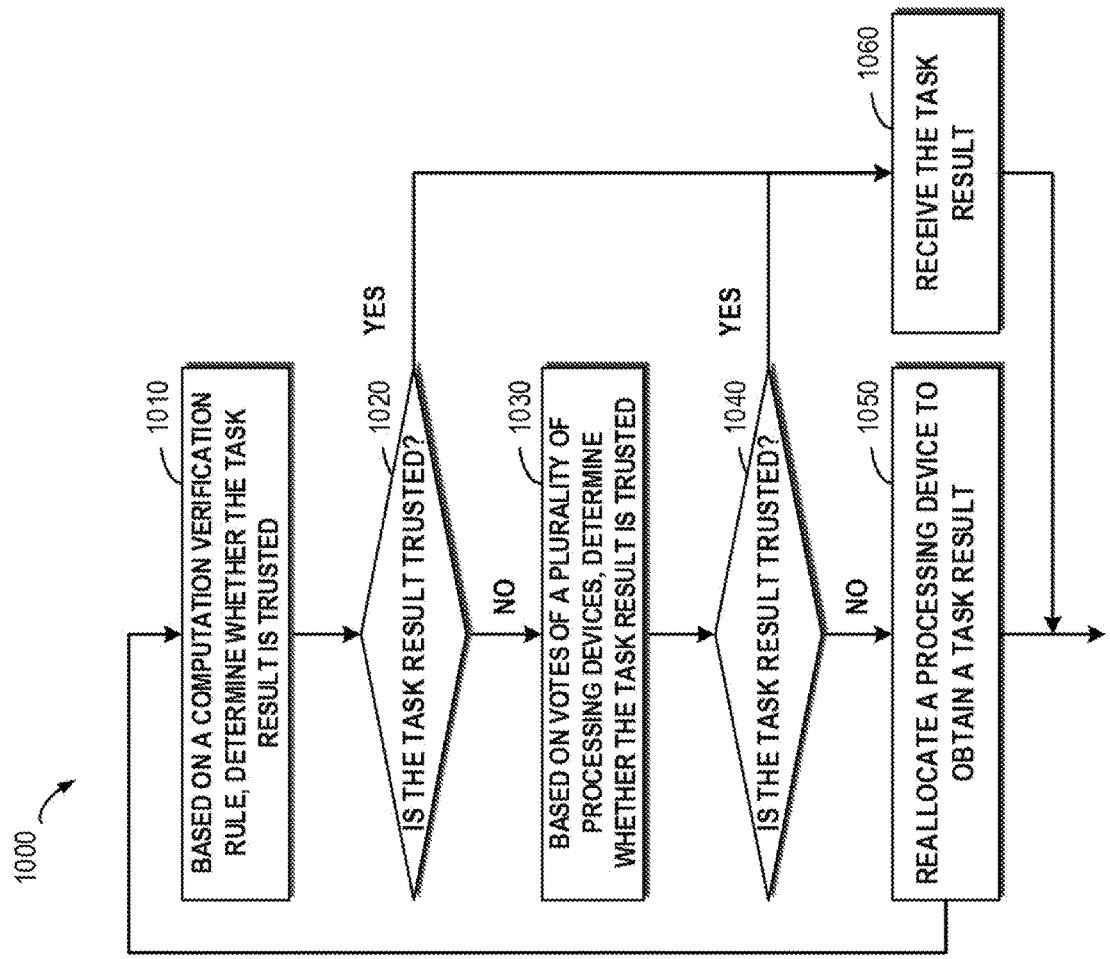
FIG. 10 schematically shows a flowchart of a method for verifying a task result according to example implementations of the present disclosure.

FIG. 10 schematically shows a flowchart of a method 1000 for verifying a task result according to example implementations of the present disclosure. The method 1000 may be performed on each task result obtained from a processing device in the blockchain-based processing system 210. As depicted, at block 1010, it may be determined whether the task result is trusted or not based on the computation verification rule. Here the computation verification rule is a technical solution which has been proposed for verifying whether a computation result is trusted or not. In the context of the present disclosure, detailed description of the computation verification rule is omitted. At block 1020, if the task result passes the verification, it means the task result is trusted, and the method 1000 may proceed to block 1060, to receive the task result. If the task result does not pass the verification, it means the task result is untrusted, and the method 1000 may proceed to block 1030 so as to start the second-level verification.

At block 1030, a request for confirming whether the task result is trusted or not may be sent to a plurality of processing devices. For example, a request for voting may be sent to the plurality of processing devices in the blockchain-based processing system 210. At this point, the plurality of processing devices may judge based on a predetermined algorithm whether the task result is a result obtained by executing allocated tasks with respect to data partitions, and the plurality of processing devices may return voting results based on their own judgment. If a plurality of votes from the plurality of processing devices satisfy a predetermined condition (e.g., more than 50% of votes are positive), then it may be determined that the task result is trusted.

At block 1040, it may be determined whether the task result is trusted based on the output at block 1030. If the task result passes the verification, it means the task result is trusted, and the method 1000 may proceed to block 1060, to receive the task result. If the task result does not pass the verification, it means the task result is untrusted, and the method 1000 may proceed to block 1050 so as to reallocate a task associated with the untrusted task result to a processing device in the distributed processing system. At this point, a processing device may be selected from the cloud service-based processing system 120, so as to ensure that a trusted task result may be obtained. According to example implementations of the present disclosure, the task may be allocated again to a processing device in the processing system 210.

By means of example implementations of the present disclosure, it may be ensured through double verification that the task results from processing devices of persons and/or small organizations are trusted. Additionally, when it is determined that the task result is untrusted, a processing device may be reselected for processing a task, so as to ensure the job proceeds smoothly.

According to example implementations of the present disclosure, rewards may be offered to a processing device that has generated a trusted task result. For example, when a processing device receives a task, rewards may be promised to the processing device, for example, rewards may be set in a locked state. Once the task result provided by the processing device is verified as trusted, then rewards may be unlocked.

If it has been determined that the task result is trusted, the processing device may write the task result to predetermined storage space and return an address of the task result in the storage space. According to example implementations of the present disclosure, the task result may be written to various locations. For example, the task result may be written to storage space in the cloud service-based processing system 120. Alternatively and/or additionally, the task result may be further written to local storage space of the processing device. Here the local storage space may be space in a memory of the processing device. Since the task result will be read by a subsequent task as input data, the task result residing on the local memory can reduce time overheads of reading input data.

Figure 11:
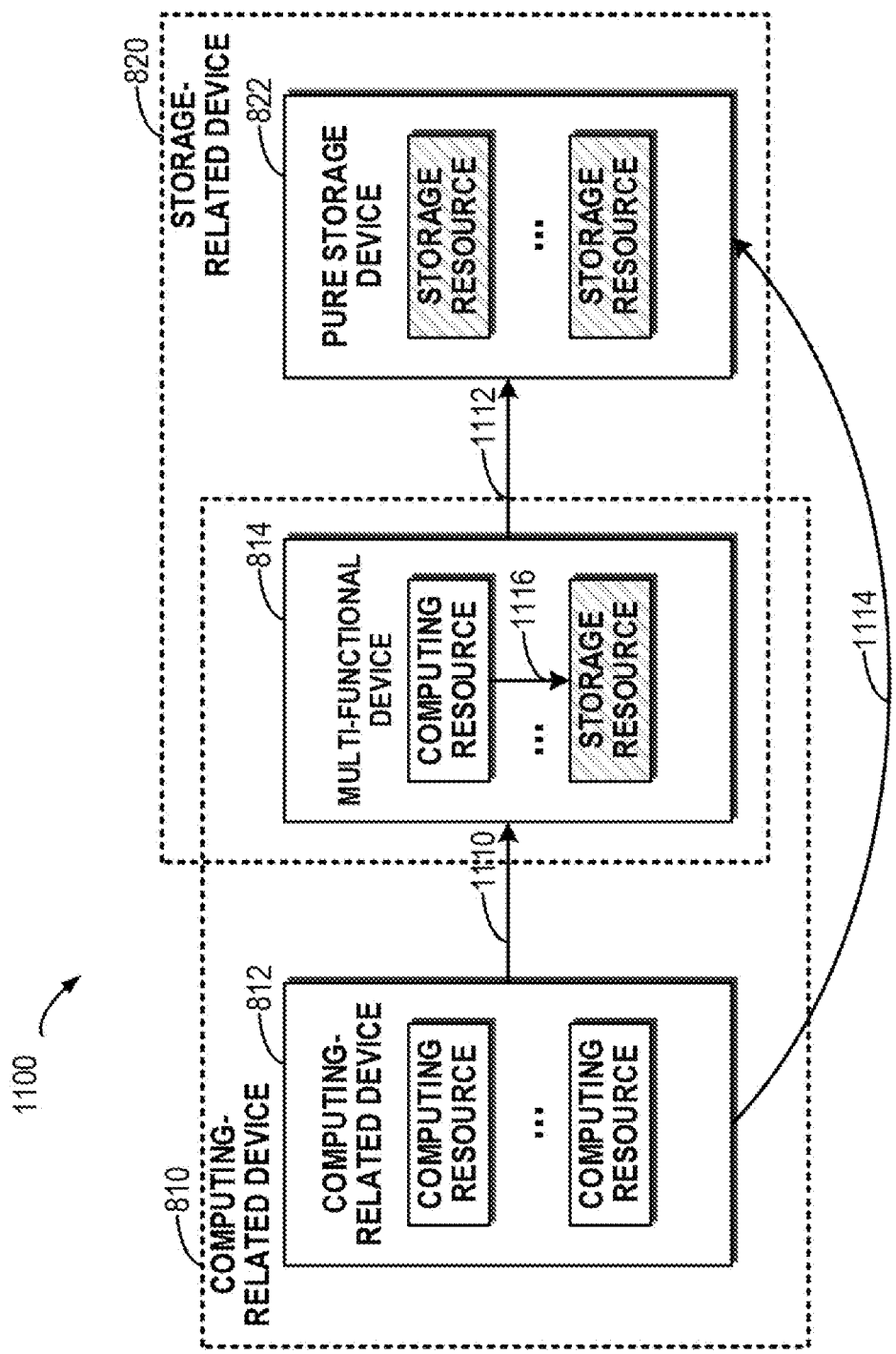
FIG. 11 schematically shows a block diagram of the procedure for writing a task result during task processing according to example implementations of the present disclosure.

According to example implementations of the present disclosure, the above method 400 may further comprise: instructing the processing device to store the task result to a storage resource of the processing device. At this point, the processing device may select from the plurality of storage devices the storage resource used for storing the task result. FIG. 11 schematically shows a block diagram 1100 of the procedure for writing a task result during task processing according to example implementations of the present disclosure.

As shown in FIG. 11, arrows 1110, 1112, 1114 and 1116 schematically show directions in which task results are written, respectively. The computing resource in the pure computing device 812 may write a task result to the storage resource in the multi-functional device 814, and the procedure for writing the task result is shown by the arrow 1110. The computing resource in the pure computing device 812 may write a task result to the storage resource in the pure storage device 822, and the procedure for writing the task result is shown by the arrow 1114. The computing resource in the multi-functional device 814 may write a task result to the storage resource in the multi-functional device 814, and the procedure for writing the task result is shown by the arrow 1116. The computing resource in the multi-functional device 814 may write a task result to the storage resource in the pure storage device 822, and the procedure for writing the task result is shown by the arrow 1112.

Returning to FIG. 3B, description is presented below to more details on the procedure for writing a task result to a storage resource in a processing device. As depicted, the processing device 212 may obtain a to-be-processed data partition (e.g., obtained from the storage resource 352) and execute a task to obtain a task result. Since the generated task result may serve as to-be-processed data of a subsequent task, and the subsequent task may be executed by the processing device 212 or another device in the processing system 210, the processing device 212 may store the obtained task result to its local storage resource 352. Alternatively and/or additionally, the processing device 212 may store the obtained task result to the local storage resource 362 of another processing device 214 in the processing system 210. For example, the task result may be stored in processing devices with the first priority and the second priority.

With example implementations of the present disclosure, it is possible to make the best use of a storage resource in a processing device to execute a task and to process data in the storage resource by using a computing resource in the processing device. In this way, on the one hand, demands for bandwidth may be reduced, time for data transmission may be cut down, and further the performance of job processing may be improved. On the other hand, by using storage resources in various processing devices in the processing system 210, a decentralized storage mode may be provided. A user may customize a more suitable storage method according to his/her own needs.

With example implementations of the present disclosure, it may be determined based on a priority where the task result is to be stored. In general, since a processing device with a higher priority (e.g., the first priority and the second priority) is likely to be allocated with a task again later, a task result generated by such a processing device may be stored to local storage space of the processing device. The processing device may be instructed to store the task result to a storage resource in a processing device with a long-term priority in the first group of processing devices. Since a processing device with lower priority (e.g., the third priority and the fourth priority) may not be allocated with a task later, a task result generated by such a processing device may be stored to the cloud service-based processing system 120. Alternatively and/or additionally, the generated task result may further be stored to a storage resource in a processing device with a long-term priority in the first group of processing devices.

According to example implementations of the present disclosure, if it is determined that a processing device in the first group of processing devices has either of the first priority or the second priority, the processing device may be instructed to store a task result generated by itself to storage space of the processing device. With example implementations of the present disclosure, even if a subsequent task is allocated to another processing device, since both the other processing device and to-be-processed data of the subsequent task are within the processing system 210, the frequent transmitting of task results and to-be-processed data between two processing systems may be effectively avoided.

According to example implementations of the present disclosure, if it is determined that a processing device in the first group of processing devices has the third priority, the processing device may be instructed to store the task result to the local storage resource of the processing device. As compared with storing the task result to a storage resource in another processing device, this approach can reduce bandwidth and time overheads of storing the storage task.

No matter where the task result is stored, a result address may be used to indicate a path for accessing the task result. The processing device may return an address that points to the generated task result, so that the subsequent operating procedure may access the task result. The job manager may receive the first group of task results of the first group of tasks from the first group of processing devices, respectively. Here, the relevant task result may be obtained based on the address of the task result.

It will be understood that since the job may involve one or more portions, if the job only involves the first portion described above, then a job result of the whole job may be generated based on the obtained first group of task results. If the job involves a plurality of portions, then subsequent second, third portions and the like may be processed similarly.

According to example implementations of the present disclosure, a second group of tasks in the second portion of the job may be obtained, which second group of tasks are executable in parallel by a second group of processing devices. For example, the second group of tasks in the second portion of the job may be obtained based on the job description 310. Subsequently, the second group of processing devices may be selected from the plurality of processing devices based on the plurality of priorities, and the second group of tasks may be allocated to the second group of processing devices, respectively, so that the second group of processing devices utilize their respective processing resources to process the second group of tasks for generating a second group of task results. Operations on the second group of tasks here are similar to those on the first group of tasks described with reference to FIG. 4, which are thereby omitted. Additionally, the second group of task results of the second group of tasks may be received from the second group of processing devices, respectively. Subsequently, a job result may be generated at least partly based on the second group of task results.

It will be understood that to-be-processed data of the second group of tasks is generated based on the first group of task results. At this point, a second group of addresses of a second group of data partitions to be processed by the second group of processing devices may be determined based on the first group of result addresses of the first group of task results. In general, for each task in the second group of tasks, a plurality of task results of the first group of tasks needs to be received. Suppose the first group of task results are locally stored in processing devices, then a task in the second group of tasks may be allocated to the same processing device as that in the first group of processing devices.

At this point, the processing device may quickly read a portion of to-be-processed data from its own local storage space, and the processing device may further read another portion of the to-be-processed data from local storage space of another processing device. With example implementations of the present disclosure, it is possible to make as much use of local storage space of a processing device as possible, so as to avoid frequently writing and/or reading data between two processing systems.

Specifically, a second group of data partitions to be processed by the second group of processing devices may be generated based on the job description 310. For example, a plurality of addresses of a plurality of task results from the first group of processing devices may be transmitted to a processing device for executing a task in the second group of tasks. Subsequently, the processing device may obtain a to-be-processed data partition based on the plurality of addresses and further execute the task with respect to the obtained data partition and generate a task result.

With example implementations of the present disclosure, on one hand the processing capabilities of the processing devices in the blockchain based processing system 210 may be utilized as much as possible; on the other hand the storage space in these processing devices may also be utilized as much as possible. Accordingly, various overheads in data transmission may be decreased and the performance for job processing may be increased.

Figure 12:
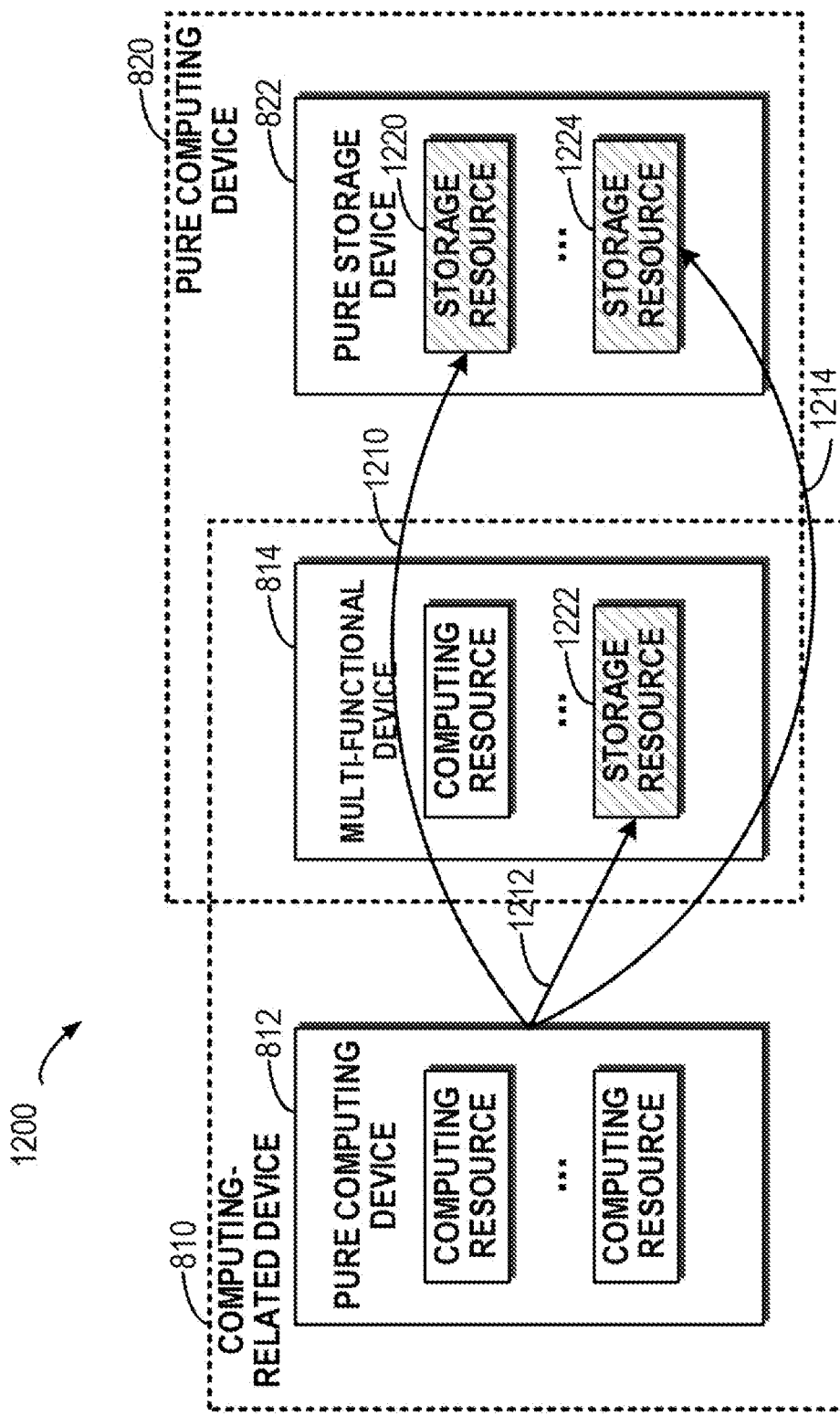
FIG. 12 schematically shows a block diagram of the procedure for backing up a task result during task processing according to example implementations of the present disclosure.

It will be understood since the reliability of the processing device in the processing system 210 cannot ensure that the stored task result is completely reliable, a backup of the task result may further be stored using storage resources in the group of processing devices. FIG. 12 schematically shows a block diagram 1200 of the procedure for backing up a task result during task processing according to example implementations of the present disclosure. As shown by arrows 1210, 1212 and 1214 in FIG. 12, the computing resource in the processing device 812 may store the task result to storage resources 1220, 1222 and 1224, respectively. According to example implementations of the present disclosure, a comparison may be made between various overheads of regenerating a task result and storing a plurality of replicas, and then an approach causing lower overheads may be selected.

While examples of the method according to the present disclosure have been described in detail with reference to FIGS. 2 to 12, description is presented below to the implementation of a corresponding apparatus. According to example implementations of the present disclosure, provided is an apparatus for processing a job. The apparatus comprises: an obtaining module configured to obtain a first group of tasks in a first portion of the job, the first group of tasks being executable in parallel by a first group of processing devices; a setting module configured to set a plurality of priorities to a plurality of processing devices based on a state of a processing resource of a processing device among the plurality of processing devices in a distributed processing system, the processing resource comprising at least one of a computing resource and a storage resource; a selecting module configured to select the first group of processing devices from the plurality of processing devices based on the plurality of priorities; and an allocating module configured to allocate the first group of tasks to the first group of processing devices, respectively, so that the first group of processing devices utilize their respective processing resources to process the first group of tasks for generating a first group of task results.

According to example implementations of the present disclosure, the allocating module comprises: a long-term allocating module configured to, with respect to a processing device among the plurality of processing devices, allocate a long-term priority to the processing device in accordance with determining that a processing resource of the processing device is usable to process a plurality of tasks associated with the job; and a short-term allocating module configured to allocate a one-time priority to the processing device in accordance with determining that the processing resource of the processing device is usable to process only one task associated with the job.

According to example implementations of the present disclosure, the processing resource comprises both a computing resource and a storage resource, and the long-term allocating module comprises: a first allocating module configured to allocate a first priority to the processing device in accordance with determining that the processing resource is usable to process all allocated tasks associated with the job; and a second allocating module configured to allocate a second priority to the processing device in accordance with determining that the processing resource is usable to process at least two allocated tasks associated with the job.

According to example implementations of the present disclosure, the apparatus further comprises an instructing module configured to instruct the processing device to store the task result to a storage resource of the first group of processing devices.

According to example implementations of the present disclosure, the instructing module comprises: a first instructing module configured to instruct the processing device to store the task result to a storage resource in a processing device with the long-term priority in the first group of processing devices; and a second instructing module configured to instruct the processing device to store the task result to the storage resource in the processing device.

According to example implementations of the present disclosure, the short-term allocating module comprises: a third allocating module configured to allocate a third priority to the processing device in accordance with determining that the processing resource is usable to process only one allocated task associated with the job, the processing resource comprising a computing resource and a storage resource; and a fourth allocating module configured to allocate a fourth priority to the processing device in accordance with determining that the processing resource is usable to process only one allocated task associated with the job, the processing resource only comprising a computing resource.

According to example implementations of the present disclosure, the allocating module comprises: a partitioning module configured to generate a first group of data partitions associated with the first group of tasks based on raw data associated with the job, respectively; a storage module configured to store the first group of data partitions to storage resources in the first group of processing devices; and an instructing module configured to instruct the first group of processing devices to obtain the first group of data partitions from the storage resources in the first group of processing devices.

According to example implementations of the present disclosure, the apparatus further comprises: a receiving module configured to receive from the first group of processing devices a first group of result addresses associated with a first group of task results of the first group of tasks; and a result obtaining module configured to obtain the first group of task results based on the first group of result addresses.

According to example implementations of the present disclosure, the obtaining module is further configured to obtain a second group of tasks in a second portion of the job, the second group of tasks being executable in parallel by a second group of processing devices; the selecting module is further configured to select the second group of processing devices from the plurality of processing devices based on the plurality of priorities; and the allocating module is further configured to allocate the second group of tasks to the second group of processing devices, respectively, so that the second group of processing devices utilize their respective processing resources to process the second group of tasks for generating a second group of task results.

According to example implementations of the present disclosure, the allocating module further comprises: an address determining module configured to determine a second group of addresses of a second group of data partitions to be processed by the second group of processing devices based on a first group of result addresses of the first group of task results; and an instructing module configured to instruct the second group of processing devices to execute the second group of tasks based on the second group of addresses.

Figure 13:
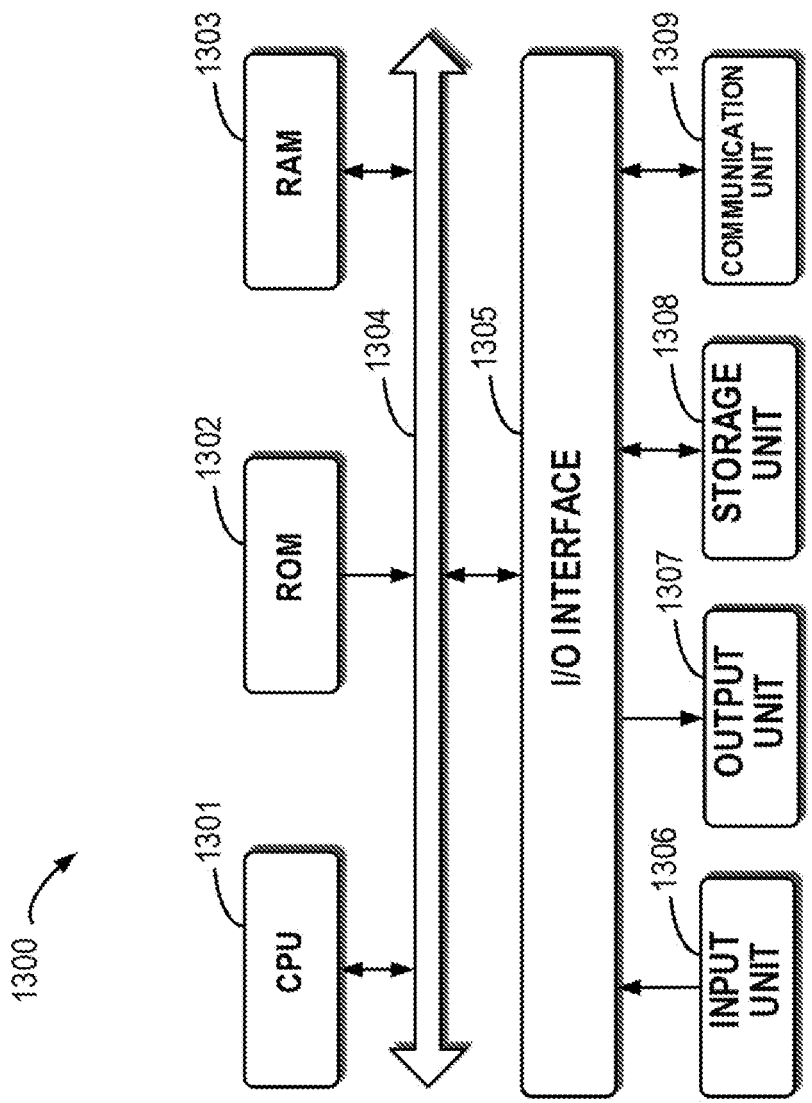
FIG. 13 schematically shows a block diagram of a device for processing a job according to example implementations of the present disclosure.

FIG. 13 schematically shows a block diagram of a device 1300 for managing an application system according to example implementations of the present disclosure. As depicted, the device 1300 includes a central processing unit (CPU) 1301, which can execute various suitable actions and processing based on the computer program instructions stored in the read-only memory (ROM) 1302 or computer program instructions loaded in the random-access memory (RAM) 1303 from a storage unit 1308. The RAM 1303 can also store all kinds of programs and data required by the operations of the device 1300. CPU 1301, ROM 1302 and RAM 1303 are connected to each other via a bus 1304. The input/output (I/O) interface 1305 is also connected to the bus 1304.

A plurality of components in the device 1300 are connected to the I/O interface 1305, including: an input unit 1306, such as a keyboard, mouse and the like; an output unit 1307, e.g., various kinds of displays and loudspeakers etc.; a storage unit 1308, such as a magnetic disk and optical disk, etc.; and a communication unit 1309, such as a network card, modem, wireless transceiver and the like. The communication unit 1309 allows the device 1300 to exchange information/data with other devices via the computer network, such as Internet, and/or various telecommunication networks.

The above described process and treatment, such as the methods 400, 700 and 1000 can also be executed by the processing unit 1301. For example, in some implementations, the methods 400, 700 and 1000 can be implemented as a computer software program tangibly included in the machine-readable medium, e.g., the storage unit 1308. In some implementations, the computer program can be partially or fully loaded and/or mounted to the device 1300 via ROM 1302 and/or the communication unit 1309. When the computer program is loaded to the RAM 1303 and executed by the CPU 1301, one or more steps of the above described methods 400, 700 and 1000 can be implemented. Alternatively, in other implementations, the CPU 1301 also can be configured in other suitable ways to realize the above procedure/method.

According to example implementations of the present disclosure, an electronic device is provided, comprising: at least one processor; and a memory coupled to the at least one processor, the memory having instructions stored thereon, the instructions, when executed by the at least one processor, causing the device to perform acts. The acts include: obtaining a first group of tasks in a first portion of the job, the first group of tasks being executable in parallel by a first group of processing devices; setting a plurality of priorities to a plurality of processing devices based on a state of a processing resource of a processing device among the plurality of processing devices in a distributed processing system, the processing resource comprising at least one of a computing resource and a storage resource; selecting the first group of processing devices from the plurality of processing devices based on the plurality of priorities; and allocating the first group of tasks to the first group of processing devices, respectively, so that the first group of processing devices utilize their respective processing resources to process the first group of tasks for generating a first group of task results.

According to example implementations of the present disclosure, allocating the first group of tasks to the first group of processing devices, respectively comprises: with respect to a processing device among the plurality of processing devices, allocating a long-term priority to the processing device in accordance with determining that a processing resource of the processing device is usable to process a plurality of tasks associated with the job; and allocating a one-time priority to the processing device in accordance with determining that the processing resource of the processing device is usable to process only one task associated with the job.

According to example implementations of the present disclosure, the processing resource comprises both a computing resource and a storage resource, and allocating the long-term priority to the processing devices comprises at least one of: allocating a first priority to the processing device in accordance with determining that the processing resource is usable to process all allocated tasks associated with the job; and allocating a second priority to the processing device in accordance with determining that the processing resource is usable to process at least two allocated tasks associated with the job.

According to example implementations of the present disclosure, the acts further comprise: instructing the processing device to store the task result to a storage resource of the first group of processing devices.

According to example implementations of the present disclosure, instructing the processing device to store the task result to the storage resource in the first group of processing devices comprises at least one of: instructing the processing device to store the task result to a storage resource in a processing device with the long-term priority in the first group of processing devices; and instructing the processing device to store the task result to the storage resource in the processing device.

According to example implementations of the present disclosure, allocating the one-time priority to the processing device comprises at least one of: allocating a third priority to the processing device in accordance with determining that the processing resource is usable to process only one allocated task associated with the job, the processing resource comprising a computing resource and a storage resource; and allocating a fourth priority to the processing device in accordance with determining that the processing resource is usable to process only one allocated task associated with the job, the processing resource only comprising a computing resource.

According to example implementations of the present disclosure, allocating the first group of tasks to the first group of processing devices, respectively comprises: generating a first group of data partitions associated with the first group of tasks, respectively, based on raw data associated with the job; storing the first group of data partitions to storage resources in the first group of processing devices; and instructing the first group of processing devices to obtain the first group of data partitions from the storage resources in the first group of processing devices.

According to example implementations of the present disclosure, the acts further comprise: receiving from the first group of processing devices a first group of result addresses associated with a first group of task results of the first group of tasks; and obtaining the first group of task results based on the first group of result addresses.

According to example implementations of the present disclosure, the acts further comprise: obtaining a second group of tasks in a second portion of the job, the second group of tasks being executable in parallel by a second group of processing devices; selecting the second group of processing devices from the plurality of processing devices based on the plurality of priorities; and allocating the second group of tasks to the second group of processing devices, respectively, so that the second group of processing devices utilize their respective processing resources to process the second group of tasks for generating a second group of task results.

According to example implementations of the present disclosure, allocating the second group of tasks to the second group of processing devices, respectively, comprises: determining a second group of addresses of a second group of data partitions to be processed by the second group of processing devices based on a first group of result addresses of the first group of task results; and instructing the second group of processing devices to execute the second group of tasks based on the second group of addresses.

According to example implementations of the present disclosure, a computer program product is provided. The computer program product is tangibly stored on a non-transitory computer-readable medium and comprises machine-executable instructions which are used to implement the method according to the present disclosure.

According to example implementations of the present disclosure, a computer-readable medium is provided. The computer-readable medium has machine-executable instructions stored thereon, the machine-executable instructions, when executed by at least one processor, causing the at least one processor to implement the method according to the present disclosure.

The present disclosure can be a method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combinations of the above. More concrete examples of the computer-readable storage media (non-exhaustive list) include: portable computer disk, hard disk, RAM, ROM, erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combination of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using an Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow charts and/or block diagrams of method, apparatus (system) and computer program products according to implementations of the present disclosure. It should be understood that each block of the flow charts and/or block diagrams and the combination of various blocks in the flow charts and/or block diagrams can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular way, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, the other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow charts and block diagrams in the drawings illustrate system architecture, functions and operations that may be implemented by system, method and computer program products according to a plurality of implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order depending on the functions involved. It should also be noted that each block in the block diagram and/or flow chart and combinations of the blocks in the block diagram and/or flow chart can be implemented by a hardware-based system exclusively for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, and to otherwise enable those of ordinary skill in the art to understand implementations of the present disclosure.

What is claimed is:

1. A method for processing a job using a plurality of processing devices in a distributed processing system, each processing device having a processing resource comprising at least one of a computing resource and a storage resource, the method comprising:

obtaining a first group of tasks in a first portion of the job, the job having a time limitation for indicating a time when a job result is desired to be completed, the first group of tasks being executable in parallel;

setting a respective priority to each processing device of the plurality of processing devices based on a state of a processing resource of the processing device, wherein the priority of each processing device is set based on a time duration for which the processing devices can process one or more tasks associated with the job within the time limitation;

selecting a first group of processing devices from the plurality of processing devices based on the respective priorities, the first group of processing devices including one or more processing devices in each of at least first and second distinct processing systems, the first processing system comprising a cloud-based processing system and the second processing system comprising a blockchain-based processing system; and allocating the first group of tasks to the first group of processing devices, respectively, so that the first group of processing devices utilize their respective processing resources to process the first group of tasks for generating a first group of task results;

wherein allocating the first group of tasks to the first group of processing devices, respectively comprises:

generating a first group of data partitions associated with the first group of tasks, respectively, based on raw data associated with the job;

storing the first group of data partitions to storage resources in the first group of processing devices; and instructing the first group of processing devices to obtain the first group of data partitions from the storage resources in the first group of processing devices;

wherein setting a respective priority to each processing device of the plurality of processing devices based on a state of a processing resource of the processing device comprises:

setting a long-term priority to at least one of the processing devices in accordance with determining that a processing resource of the processing device is usable to process a plurality of tasks associated with the job, the long-term priority being based on the processing device not refusing to execute any task associated with the job;

wherein the first group of task results comprises one or more task results generated by one or more processing devices of the blockchain-based processing system; and wherein the one or more task results generated by the one or more processing devices of the blockchain-based processing system are subject to a multi-level verification process comprising at least a first level in which a verification determination is made as to whether or not the one or more task results are trusted and a second level in which, responsive to the verification determination indicating that the one or more task results are not trusted, voting of multiple processing devices of the blockchain-based processing system is utilized to determine if at least a threshold number of the processing devices vote in a particular manner.

2. The method of claim 1, wherein setting a respective priority to each processing device of the plurality of processing devices based on a state of a processing resource of the processing device further comprises:

setting a one-time priority to at least one of the processing devices in accordance with determining that the processing resource of the processing device is usable to process only one task associated with the job.

3. The method of claim 2, wherein the processing resource comprises both a computing resource and a storage resource, and setting the long-term priority to the processing devices comprises at least one of:

setting a first priority to the processing device in accordance with determining that the processing resource is usable to process all allocated tasks associated with the job; and setting a second priority to the processing device in accordance with determining that the processing resource is usable to process at least two allocated tasks associated with the job.

4. The method of claim 2, further comprising:

instructing the processing device to store the task result to a storage resource of the first group of processing devices.

5. The method of claim 4, wherein instructing the processing device to store the task result to the storage resource in the first group of processing devices comprises at least one of:

instructing the processing device to store the task result to a storage resource in a processing device with the long-term priority in the first group of processing devices; and instructing the processing device to store the task result to the storage resource in the processing device.

6. The method of claim 2, wherein setting the one-time priority to the processing device comprises at least one of:

setting a third priority to the processing device in accordance with determining that the processing resource is usable to process only one allocated task associated with the job, the processing resource comprising a computing resource and a storage resource; and setting a fourth priority to the processing device in accordance with determining that the processing resource is usable to process only one allocated task associated with the job, the processing resource only comprising a computing resource.

7. The method of claim 4, further comprising:

receiving from the first group of processing devices a first group of result addresses associated with a first group of task results of the first group of tasks; and obtaining the first group of task results based on the first group of result addresses.

8. The method of claim 7, further comprising:

obtaining a second group of tasks in a second portion of the job, the second group of tasks being executable in parallel by a second group of processing devices;

selecting the second group of processing devices from the plurality of processing devices based on the respective priorities; and allocating the second group of tasks to the second group of processing devices, respectively, so that the second group of processing devices utilize their respective processing resources to process the second group of tasks for generating a second group of task results.

9. The method of claim 8, wherein allocating the second group of tasks to the second group of processing devices, respectively comprises:

determining a second group of addresses of a second group of data partitions to be processed by the second group of processing devices based on the first group of result addresses of the first group of task results; and instructing the second group of processing devices to execute the second group of tasks based on the second group of addresses.

10. An electronic device, comprising:

at least one processor; and a memory coupled to the at least one processor, the memory having instructions stored thereon, the instructions, when executed by the at least one processor, causing the electronic device to perform acts for processing a job using a plurality of processing devices in a distributed processing system, each processing device having a processing resource comprising at least one of a computing resource and a storage resource, the acts including:

obtaining a first group of tasks in a first portion of the job, the job having a time limitation for indicating a time when a job result is desired to be completed, the first group of tasks being executable in parallel;

setting a respective priority to each processing device of the plurality of processing devices based on a state of a processing resource of the processing device wherein the priority of each processing device is set based on a time duration for which the processing devices can process one or more tasks associated with the job within the time limitation;

selecting a first group of processing devices from the plurality of processing devices based on the respective priorities, the first group of processing devices including one or more processing devices in each of at least first and second distinct processing systems, the first processing system comprising a cloud-based processing system and the second processing system comprising a blockchain-based processing system; and allocating the first group of tasks to the first group of processing devices, respectively, so that the first group of processing devices utilize their respective processing resources to process the first group of tasks for generating a first group of task results;

wherein allocating the first group of tasks to the first group of processing devices, respectively comprises:

generating a first group of data partitions associated with the first group of tasks, respectively, based on raw data associated with the job;

storing the first group of data partitions to storage resources in the first group of processing devices; and instructing the first group of processing devices to obtain the first group of data partitions from the storage resources in the first group of processing devices;

wherein setting a respective priority to each processing device of the plurality of processing devices based on a state of a processing resource of the processing device comprises:

setting a long-term priority to at least one of the processing devices in accordance with determining that a processing resource of the processing device is usable to process a plurality of tasks associated with the job, the long-term priority being based on the processing device not refusing to execute any task associated with the job;

wherein the first group of task results comprises one or more task results generated by one or more processing devices of the blockchain-based processing system; and wherein the one or more task results generated by the one or more processing devices of the blockchain-based processing system are subject to a multi-level verification process comprising at least a first level in which a verification determination is made as to whether or not the one or more task results are trusted and a second level in which, responsive to the verification determination indicating that the one or more task results are not trusted, voting of multiple processing devices of the blockchain-based processing system is utilized to determine if at least a threshold number of the processing devices vote in a particular manner.

11. The electronic device of claim 10, wherein setting a respective priority to each processing device of the plurality of processing devices based on a state of a processing resource of the processing device further comprises:

setting a one-time priority to at least one of the processing devices in accordance with determining that the processing resource of the processing device is usable to process only one task associated with the job.

12. The electronic device of claim 11, wherein the processing resource comprises both a computing resource and a storage resource, and setting the long-term priority to the processing devices comprises at least one of:

setting a first priority to the processing device in accordance with determining that the processing resource is usable to process all allocated tasks associated with the job; and setting a second priority to the processing device in accordance with determining that the processing resource is usable to process at least two allocated tasks associated with the job.

13. The electronic device of claim 11, wherein the acts further comprise:

instructing the processing device to store the task result to a storage resource of the first group of processing devices.

14. The electronic device of claim 13, wherein instructing the processing device to store the task result to the storage resource in the first group of processing devices comprises at least one of:

instructing the processing device to store the task result to a storage resource in a processing device with the long-term priority in the first group of processing devices; and instructing the processing device to store the task result to the storage resource in the processing device.

15. The electronic device of claim 11, wherein setting the one-time priority to the processing device comprises at least one of:

setting a third priority to the processing device in accordance with determining that the processing resource is usable to process only one allocated task associated with the job, the processing resource comprising a computing resource and a storage resource; and setting a fourth priority to the processing device in accordance with determining that the processing resource is usable to process only one allocated task associated with the job, the processing resource only comprising a computing resource.

16. The electronic device of claim 13, wherein the acts further comprise:

receiving from the first group of processing devices a first group of result addresses associated with a first group of task results of the first group of tasks; and obtaining the first group of task results based on the first group of result addresses.

17. The electronic device of claim 16, wherein the acts further comprise:

obtaining a second group of tasks in a second portion of the job, the second group of tasks being executable in parallel by a second group of processing devices;

selecting the second group of processing devices from the plurality of processing devices based on the respective priorities; and allocating the second group of tasks to the second group of processing devices, respectively, so that the second group of processing devices utilize their respective processing resources to process the second group of tasks for generating a second group of task results.

18. A computer program product, tangibly stored on a non-transitory computer-readable medium and comprising machine-executable instructions, which when executed by a processor of an electronic device, cause the electronic device to perform steps of a method for processing a job using a plurality of processing devices in a distributed processing system, each processing device having a processing resource comprising at least one of a computing resource and a storage resource, the method comprising:

obtaining a first group of tasks in a first portion of the job, the job having a time limitation for indicating a time when a job result is desired to be completed, the first group of tasks being executable in parallel;

setting a respective priority to each processing device of the plurality of processing devices based on a state of a processing resource of the processing device, wherein the priority of each processing device is set based on a time duration for which the processing devices can process one or more tasks associated with the job within the time limitation;

selecting a first group of processing devices from the plurality of processing devices based on the respective priorities, the first group of processing devices including one or more processing devices in each of at least first and second distinct processing systems, the first processing system comprising a cloud-based processing system and the second processing system comprising a blockchain-based processing system; and allocating the first group of tasks to the first group of processing devices, respectively, so that the first group of processing devices utilize their respective processing resources to process the first group of tasks for generating a first group of task results;

wherein allocating the first group of tasks to the first group of processing devices, respectively comprises:

generating a first group of data partitions associated with the first group of tasks, respectively, based on raw data associated with the job;

storing the first group of data partitions to storage resources in the first group of processing devices; and instructing the first group of processing devices to obtain the first group of data partitions from the storage resources in the first group of processing devices;

wherein setting a respective priority to each processing device of the plurality of processing devices based on a state of a processing resource of the processing device comprises:

setting a long-term priority to at least one of the processing devices in accordance with determining that a processing resource of the processing device is usable to process a plurality of tasks associated with the job, the long-term priority being based on the processing device not refusing to execute any task associated with the job;

wherein the first group of task results comprises one or more task results generated by one or more processing devices of the blockchain-based processing system; and wherein the one or more task results generated by the one or more processing devices of the blockchain-based processing system are subject to a multi-level verification process comprising at least a first level in which a verification determination is made as to whether or not the one or more task results are trusted and a second level in which, responsive to the verification determination indicating that the one or more task results are not trusted, voting of multiple processing devices of the blockchain-based processing system is utilized to determine if at least a threshold number of the processing devices vote in a particular manner.

19. The computer program product of claim 18, wherein setting a respective priority to each processing device of the plurality of processing devices based on a state of a processing resource of the processing device further comprises:

setting a one-time priority to at least one of the processing devices in accordance with determining that the processing resource of the processing device is usable to process only one task associated with the job.

20. The computer program product of claim 19, wherein the method further comprises:

instructing the processing device to store the task result to a storage resource of the first group of processing devices.

* * * * *